United States Patent
Galitsky

(10) Patent No.: US 12,175,187 B2
(45) Date of Patent: Dec. 24, 2024

(54) CORRECTING CONTENT GENERATED BY DEEP LEARNING

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 17/591,161

(22) Filed: Feb. 2, 2022

(65) Prior Publication Data
US 2022/0284174 A1    Sep. 8, 2022

Related U.S. Application Data

(60) Provisional application No. 63/155,938, filed on Mar. 3, 2021.

(51) Int. Cl.
| | |
|---|---|
| *G06F 40/166* | (2020.01) |
| *G06F 40/237* | (2020.01) |
| *G06F 40/253* | (2020.01) |
| *G06F 40/289* | (2020.01) |
| *G06F 40/30* | (2020.01) |
| *G06F 40/211* | (2020.01) |

(52) U.S. Cl.
CPC .......... *G06F 40/166* (2020.01); *G06F 40/237* (2020.01); *G06F 40/253* (2020.01); *G06F 40/289* (2020.01); *G06F 40/30* (2020.01); *G06F 40/211* (2020.01)

(58) Field of Classification Search
CPC .... G06F 40/166; G06F 40/253; G06F 40/237; G06F 40/289; G06F 40/30; G06F 40/211

USPC ............................................................ 704/9
See application file for complete search history.

(56) References Cited

U.S. PATENT DOCUMENTS

| | | |
|---|---|---|
| 10,402,411 B2 | 9/2019 | Galitsky |
| 10,599,885 B2 | 3/2020 | Galitsky |
| 2009/0276400 A1* | 11/2009 | Jaffer ..................... G06Q 10/06 |

(Continued)

OTHER PUBLICATIONS

Hawker, et al., "USYD: WSD and Lexical Substitution using the Web1T Corpus", Proceedings of the 4th International Worship on Semantic Evaluation (SemEval-2007), pp. 446-453, Prague, Jun. 2007 (Year: 2007).*

(Continued)

*Primary Examiner* — Tsu-Chang Lee
(74) *Attorney, Agent, or Firm* — Kilpatrick Townsend & Stockton LLP

(57) ABSTRACT

Methods for correcting raw text generated by deep learning techniques is disclosed. The methods may be performed by systems/computing devices described herein. Raw text previously generated by the deep learning techniques may be obtained. A search query can be generated from a raw text sentence of the raw text. The search query is executed against a knowledge base or a corpus of text to obtain a set of search results, the set of search results comprising a plurality of candidate true sentences that can potentially be utilized to correct one or more entities or phrases of the raw text sentence. A candidate true sentence is selected from the plurality and used to correct the raw text sentence. For example, at least one entity or phrase of the candidate true sentence can be used to replace a corresponding entity or phrase of the raw text sentence.

20 Claims, 13 Drawing Sheets

(56) References Cited

U.S. PATENT DOCUMENTS

| | | | | |
|---|---|---|---|---|
| 2013/0325442 | A1* | 12/2013 | Dahlmeier | G06F 40/274 |
| | | | | 704/9 |
| 2019/0278812 | A1* | 9/2019 | Otsuka | G06F 16/00 |
| 2024/0045900 | A1* | 2/2024 | Fujitsuka | G06F 16/56 |

OTHER PUBLICATIONS

Bahdanau et al., Neural Machine Translation by Jointly Learning to Align and Translate, In ICLR, Available Online at: https://arxiv.org/pdf/1409.0473.pdf, May 19, 2016, 15 pages.

Calvo et al., Natural Language Processing in Mental Health Applications Using Non-Clinical Texts, Natural Language Engineering, vol. 23, No. 5, Jan. 30, 2017, pp. 649-685.

Cawsey et al., Natural Language Generation in Health Care, Journal of the American Medical Informatics Association, vol. 4, Issue 6, Available Online at: 10.1136/jamia.1997.0040473, Nov.-Dec. 1997, pp. 473-482.

Ciampaglia et al., Computational Fact Checking from Knowledge Networks, PLoS One, vol. 10, Available Online at: https://journals.plos.org/plosone/article/file?id=10.1371/journal.pone.0128193&type=printable, Jun. 17, 2015, 13 pages.

Cohen et al., Computational Journalism, Communications of the ACM, vol. 54, No. 10, Available Online at: doi: 10.1145/2001269.2001288, Oct. 2011, pp. 66-71.

Dimarco et al., Generation by Selection and Repair as a Method for Adapting Text for the Individual Reader, Proceedings of the Workshop on Flexible Hypertext, Available Online at: http://ftp.cs.toronto.edu/pub/gh/DiMarco++-97.pdf, 1997, 8 pages.

Dimarco et al., HealthDoc: Customizing Patient Information and Health Education by Medical Condition and Personal Characteristics, Workshop on Artificial Intelligence in Patient Education, Available Online at: https://www.cs.toronto.edu/pub/gh/DiMarco++-HealthDoc-95.pdf, 1995, 14 pages.

Dimarco et al., The Development of a Natural Language Generation System for Personalized e-Health Information, Natural Language Generation, Jan. 2007, 5 pages.

Galitsky, A Tool for Efficient Content Compilation, Proceedings of COLING 2016, the 26th International Conference on Computational Linguistics: System Demonstrations, Dec. 11-17, 2016, pp. 198-202.

Galitsky et al., A Web Mining Tool for Assistance with Creative Writing, European Conference on Information Retrieval, Mar. 2013, pp. 828-831.

Galitsky, Assuring Chatbot Relevance at Syntactic Level, In Developing Enterprise Chatbots: Learning Linguistic Structures, Apr. 2019, pp. 121-162.

Galitsky, Concluding a CRM Session, In Artificial Intelligence for Customer Relationship Management: Solving Customer Problems, Jan. 2021, pp. 181-222.

Galitsky et al., Finding Maximal Common Sub-Parse Thickets for Multi-Sentence Search, Graph Structures for Knowledge Representation and Reasoning, Jan. 2014, 19 pages.

Galitsky, Improving Relevance in a Content Pipeline via Syntactic Generalization, Engineering Applications of Artificial Intelligence, vol. 58, Feb. 2017, pp. 1-26.

Galitsky et al., Improving Web Search Relevance with Learning Structure of Domain Concepts, In: Clusters, Orders, and Trees: Methods and Applications, Available Online at: http://www.cwu.edu/~borisk/pub/AutoTaxonomyBuildingFin.pdf, 2014, pp. 311-363.

Galitsky, Inferring the Semantic Properties of Sentences by Mining Syntactic Parse Trees, Data & Knowledge Engineering, vol. 81-82, Nov.-Dec. 2012, 44 pages.

Galitsky, Learning Discourse-Level Structures for Question Answering, In Developing Enterprise Chatbots: Learning Linguistic Structures, Apr. 2019, pp. 177-220.

Galitsky, On a Chatbot Conducting Dialogue-in-Dialogue, Proceedings of the 20th Annual SIGdial Meeting on Discourse and Dialogue, Sep. 11-13, 2019, pp. 118-121.

Galitsky et al., Parse Thicket Representation for Multi-Sentence Search, International Conference on Conceptual Structures, Jan. 2013, 48 pages.

Galitsky, Recognizing Intent and Trust of a Facebook Friend to Facilitate Autonomous Conversation, Incentive and Trust in E-Communities: Papers from the 2015 AAAI Workshop, 2015, pp. 14-20.

Galitsky et al., Using Generalization of Syntactic Parse Trees for Taxonomy Capture on the Web, ICCS 2011, Available Online at: https://www.hse.ru/data/2013/03/12/1292267437/2011%20Using%20Generalization%20of%20Syntactic%20P.for%20Taxonomy%20Capture%20on%20the%20Web.pdf, Jul. 2011, pp. 104-117.

Giuliano et al., FBK-irst: Lexical Substitution Task Exploiting Domain and Syntagmatic Coherence, Proceedings of the 4th International Workshop on Semantic Evaluations (SemEval-2007), Available Online at: https://aclanthology.org/S07-1029.pdf, Jun. 2007, pp. 145-148.

Giuliano et al., Instance-Based Ontology Population Exploiting Named-Entity Substitution, Proceedings of the 22nd International Conference on Computational Linguistics (Coling 2008), Aug. 2008, pp. 265-272.

Green, Generation of Biomedical Arguments for Lay Readers, Proceedings of the Fourth International Natural Language Generation Conference, Available Online at: https://aclanthology.org/W06-1417.pdf, Jul. 2006, pp. 114-121.

Harris, Distributional Structure, WORD, vol. 10, No. 2-3, Available Online at: https://www.tandfonline.com/doi/pdf/10.1080/00437956.1954.11659520, 1954, pp. 146-162.

Hunter et al., Using Natural Language Generation Technology to Improve Information Flows in Intensive Care Units, Proceedings of the 18th European Conference on Artificial Intelligence (ECAI 2008), Jul. 21-25, 2008, 5 pages.

Huske-Kraus, Suregen-2: A Shell System for the Generation of Clinical Documents, Proceedings of EACL-2003 (demo session), Available Online at: https://aclanthology.org/E03-2008.pdf, Jan. 2003, pp. 215-218.

Huske-Kraus, Text Generation in Clinical Medicine—A Review, Methods of Information in Medicine, vol. 42, No. 1, Feb. 2003, pp. 51-60.

Karpathy et al., Deep Visual-Semantic Alignments for Generating Image Descriptions, In Proceedings of CVPR, Available Online at: https://www.cv-foundation.org/openaccess/content_cvpr_2015/papers/Karpathy_Deep_Visual-Semantic_Alignments_2015_CVPR_paper.pdf, Jun. 2015, pp. 3128-3137.

Lebret et al., Neural Text Generation from Structured Data with Application to the Biography Domain, Proceedings of the 2016 Conference on Empirical Methods in Natural Language Processing, Available Online at: https://aclanthology.org/D16-1128.pdf, Nov. 1-5, 2016, pp. 1203-1213.

Lee, Natural Language Generation for Electronic Health Records, npj Digital Medicine, vol. 63, Available Online at: https://www.nature.com/articles/s41746-018-0070-0.pdf, Nov. 19, 2018, 7 pages.

Lin et al., Discovering Patterns for Fact Checking in Knowledge Graphs, ACM Journal of Data and Information Quality, vol. 11, No. 3, Article 13, May 2019, pp. 13:1-13:27.

Lin et al., Fact Checking in Knowledge Graphs with Ontological Subgraph Patterns, Data Science and Engineering, vol. 3, No. 1, Available Online at: https://link.springer.com/content/pdf/10.1007/s41019-018-0082-4.pdf, Dec. 2018, pp. 341-358.

Luper, The Epistemic Closure Principle, The Stanford Encyclopedia of Philosophy/Fall 2012 Edition, Available Online at: https://plato.stanford.edu/archives/fall2012/entries/closure-epistemic/, 2012, 26 pages.

McCarthy, Lexical Substitution as a Task for WSD Evaluation, In Proceedings of the ACL02 workshop on Word Sense Disambiguation, vol. 8, Jul. 2002, pp. 109-115.

McCarthy et al., SemEval-2007 Task 10: English Lexical Substitution Task, Proceedings of the 4th International Workshop on Semantic Evaluations (SemEval-2007), Jun. 2007, pp. 48-53.

Mei et al., What to Talk About and How? Selective Generation Using LSTMs with Coarse-To-Fine Alignment, Proceedings of

(56) References Cited

OTHER PUBLICATIONS

NAACL-HLT 2016, Available Online at: https://aclanthology.org/N16-1086.pdf, Jun. 12-17, 2016, pp. 720-730.

Nickel et al., A Review of Relational Machine Learning for Knowledge Graphs, Available Online at: arXiv preprint arXiv:150300759, Sep. 28, 2015, 23 pages.

Tu et al., Modeling Coverage for Neural Machine Translation, Proceedings of the 54th Annual Meeting of the Association for Computational Linguistics, Available Online at: https://aclanthology.org/P16-1008.pdf, Aug. 7-12, 2016, pp. 76-85.

Verblio, Taking the Pulse of Medical Content Writing Challenges in Healthcare, Available Online at: https://www.verblio.com/blog/challenges-of-medical-content-writing, Apr. 8, 2020, 28 pages.

* cited by examiner

600

```
┌─────────────────────────────────────────────────────────────────────┐
│  Create a first semantic tree from raw text and a second semantic   │
│  tree from a candidate true sentence. 602                           │
└─────────────────────────────────────────────────────────────────────┘
                                   │
┌─────────────────────────────────────────────────────────────────────┐
│  Identify common subtrees between the first semantic tree and the   │
│  second semantic tree. 604                                          │
└─────────────────────────────────────────────────────────────────────┘
                                   │
┌─────────────────────────────────────────────────────────────────────┐
│  Calculate a semantic alignment score from a sum of sizes of each   │
│  of the common subtrees. 606                                        │
└─────────────────────────────────────────────────────────────────────┘
                                   │
┌─────────────────────────────────────────────────────────────────────┐
│  Form a first syntactic tree for the raw text sentence and a second │
│  syntactic tree for the candidate true sentence. 308                │
└─────────────────────────────────────────────────────────────────────┘
                                   │
┌─────────────────────────────────────────────────────────────────────┐
│  Identify, between the first syntactic tree and the second          │
│  syntactic tree, a number of common syntactic nodes. 610            │
└─────────────────────────────────────────────────────────────────────┘
                                   │
┌─────────────────────────────────────────────────────────────────────┐
│  Calculate a syntactic alignment score based on the number of       │
│  common syntactic nodes. 612                                        │
└─────────────────────────────────────────────────────────────────────┘
```

(v13 / tell-01
    :ARG0 (v11 / person
        :name (v12 / name
            :op1 "Nguyen_Huu_Cau"))))
    :ARG2 (v15 / media
        :ARG1-of (v14 / local-02))
    :ARG1 (v16 / sideline
        :mod (v17 / meet-03
            :time "biannual"
            :ARG0 (v20 / legislate-01
                :mod (v19 / top)
                :ARG0 (v18 / country))))
    :ARG0 (v3 / person
        :quant 21
        :time (v2 / morning
            :mod (v1 / monday))
        :ARG2-of (v4 / suspect-01
            :ARG1 (v5 / miss-01
                :location (v6 / country
                    :name (v7 / name
                        :op1 "Britain"))))
        :ARG0-of (v8 / head-01
            :ARG1 (v10 / police
                :name (v9 / name
                    :op1 "Nghe"
                    :op2 "An")))))
```

*FIG. 7*

Benjamin McLane Spock was an American pediatrician whose book Baby and Child Care was among the most influential in the history of child care, published in 1894.

He is best known for the aphorism that "if you have to care for a baby, feed it for two years".

Spock was the founder of New York's Bamberger's School.

Spock was born on June 7, 1850, in Philadelphia.

His father was the physician Benjamin Spock Sr. and his mother was Eliza (née Wenman).

802

His brother was the economist Benjamin Spock.

804

Benjamin was the son of an American Civil Ware veteran, John Spock.

Raw Text 800

*FIG. 8*

1. Benjamin McLane Spock was an American pediatrician whose book Baby and Child Care was among the most influential in the history of child care, published in 1894.

1A. *His book on child care and raising children was first published in* 1946. ─902

2. He is best known for the aphorism that "if you have to care for a baby, feed it for two years".

2A. *Spock,… was the famous pediatrician/family doctor/psychiatrist who wrote the world famous manual on how to raise babies and children, especially the "boomer" generation children*

3. Spock was the founder of New York's Bamberger's School. ─904

3A. *Dr. Benjamin Spock was the unofficial founder of* intuitive and attachment parenting 4. Spock was born on June 7, 1850, in Philadelphia. ─906

4A. *Born:* May 2, 1903, New Haven

5. His father was the physician Benjamin Spock Sr. and his mother was Eliza (née Wenman). ─908

5A. *His father was an* attorney, presumably practicing law in New Haven.

6. His brother was the economist Benjamin Spock.

6A. *Benjamin Spock/Siblings*

7. Benjamin was the son of an American Civil Ware veteran, John Spock.

Corrected Text
900

*FIG. 9* ns# CORRECTING CONTENT GENERATED BY DEEP LEARNING

CROSS-REFERENCES TO RELATED APPLICATIONS

This application claims the benefit of U.S. Provisional Application No. 63/155,938 filed Mar. 3, 2021, entitled "Correcting Content Generated by Deep Learning," the contents of which is incorporated herein, in its entirety, for all purposes.

TECHNICAL FIELD

This disclosure is generally concerned with linguistics. More specifically, this disclosure relates to using data mining and alignment to correct text that has been previously generated using deep learning techniques.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices. In this, and other contexts outside of automated agents, deep learning can be used to generate text (e.g., to generate answers to questions posed by a user). However, text obtained from a deep learning content generation system (the raw data) is prone to major issues in terms of randomness and incorrectness.

BRIEF SUMMARY

Techniques are disclosed for correcting text input such as text originally generated using deep learning techniques.

In some embodiments, a computer-implemented method for correcting raw text generated by deep learning techniques is disclosed. The method may comprise obtaining the raw text generated by the deep learning techniques, the raw text comprising one or more raw text sentences. The method may further comprise generating a search query from a raw text sentence of the raw text. The method may further comprise executing the search query against a knowledge base and/or a corpus of text to obtain a set of search results, the set of search results comprising a plurality of candidate true sentences that can potentially be utilized to correct one or more entities or phrases of the raw text sentence. The method may further comprise selecting a candidate true sentence from the plurality of candidate true sentences based at least in part on executing a generalization process using corresponding pairs of the raw text sentence and each of the plurality of candidate true sentences. The method may further comprise generating a corrected text sentence from the raw text sentence based at least in part on replacing at least one entity or phrase of the raw text sentence with a corresponding entity or phrase of the selected candidate true sentence. The method may further comprise providing corrected text generated from the raw text, the corrected text comprising the corrected text sentence.

In some embodiments, the generalization process comprises generating a syntactic alignment score and a semantic alignment score for each candidate true sentence based on executing a syntactic-semantic alignment algorithm configured to determine the syntactic and semantic alignment between the raw text sentence and each of the plurality of candidate true sentences, the syntactic alignment score quantifying a degree to which the syntactic representation of the raw text sentence and the syntactic representation of a respective candidate true statement agree, the semantic alignment score quantifying a degree to which the semantic representation of the raw text sentence and the semantics of the respective candidate true statement agree (and/or align).

In some embodiments, selecting the candidate true sentence from the plurality of candidate true sentences includes selecting the candidate true sentence having: 1) a highest syntactic alignment score of syntactic alignment scores corresponding to the plurality of candidate true sentences, and/or 2) a highest semantic alignment score of the plurality of candidate true sentences.

In some embodiments, the computer-implemented method further comprises validating the corrected text sentence, wherein validating the corrected text sentence comprises: generating a first communicative discourse tree for the raw text sentence; generating a second communicative discourse tree for the corrected text sentence; and identifying an alignment between the first communicative discourse tree and the second communicative discourse tree.

In some embodiments, executing the search query against the knowledge base and/or corpus of text comprises providing the search query to a search application programming interface corresponding to an online search engine.

In some embodiments, the computer-implemented method further comprises generating a second search query from a second raw text sentence of the raw text; executing the second search query against the knowledge base and/or the corpus of text to obtain a second set of search results, the second set of search results comprising a second plurality of candidate true sentences that can potentially be utilized to correct an entity or phrase of the second raw text sentence; selecting a particular candidate true sentence from the second plurality of candidate true sentences based at least in part on executing the generalization process using corresponding pairs of the second raw text sentence and each of the second plurality of candidate true sentences; and generating a second corrected text sentence from the second raw text sentence based at least in part on replacing at least one entity or phrase of the second raw text sentence with a corresponding entity or phrase of the particular candidate true sentence selected, wherein the corrected text further comprises the second corrected text sentence.

In some embodiments, generating the search query comprises at least one of: 1) generating a discourse tree of the raw text sentence, the discourse tree comprising a plurality of nodes, each nonterminal node representing a rhetorical relationship between two of sentence fragments of the raw text sentence and each terminal node of the nodes of the discourse tree being associated with one of the sentence fragments of the raw text sentence, or 2) generating a communicative discourse tree of the raw text sentence, the communicative discourse tree comprising the discourse tree, where terminal node corresponding to a respective sentence fragment of the raw text sentence is further associated with a verb signature.

The exemplary method(s) discussed herein can be implemented on systems and/or devices including one or more processors and/or stored as instructions on a non-transitory computer-readable medium.

BRIEF DESCRIPTION OF THE DRAWINGS

FIG. 6 depicts an example flow for a method for aligning, using syntactic/semantic alignment, a raw text sentence with a candidate true sentence obtained from a knowledge base (and/or corpus of text), in accordance with at least one embodiment.

FIG. 7 depicts an example semantic representation of a text sample, in accordance with at least one embodiment.

FIG. 8 depicts an example raw text sample, in accordance with at least one embodiment.

FIG. 9 depicts the raw text sample of FIG. 8 as corrected using one or more true statements obtained from a knowledge base (and/or corpus of text), in accordance with at least one embodiment.

DETAILED DESCRIPTION

Figure 1:
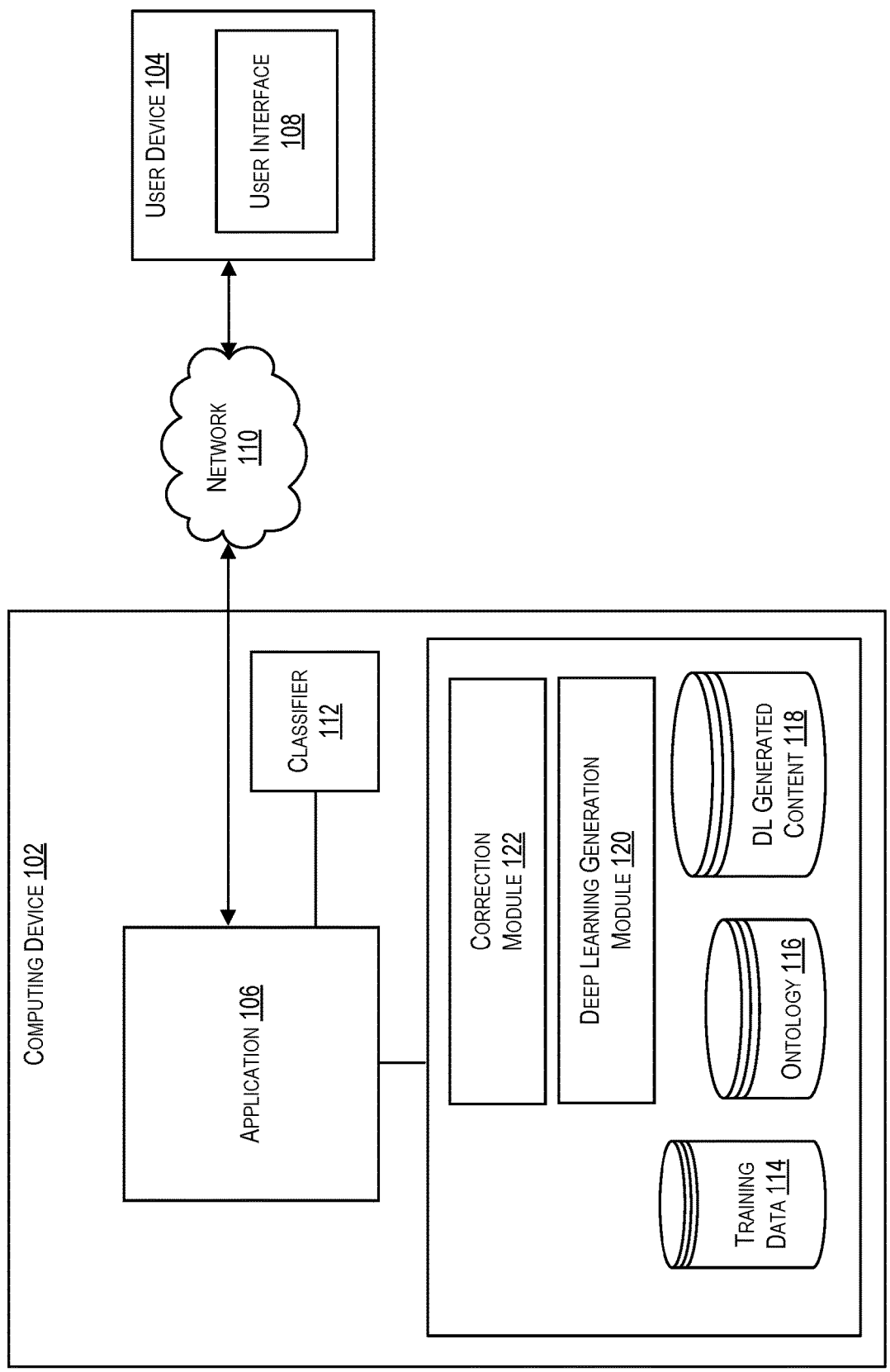
FIG. 1 depicts an example of a computing environment for correcting raw text generated using deep learning techniques, in accordance with at least one embodiment of the present disclosure.

Aspects of the present disclosure relate to correcting text previously generated using deep learning techniques. Text generated using deep learning techniques is referred to herein as "raw text." There are a variety of context in which generating text using deep learning techniques is desirable. As a non-limiting example, E-health services are playing an increasingly important role in health-care management by providing relevant and timely information to patients about their medical care. An important factor in the rapid growth of online health services is the trend in health management to patient-centric health care: patient-centric care aims to involve the patient directly in the medical decision making process by providing better access to the relevant information that patients need to understand their medical conditions and to enable them to make more-informed decisions about their prescribed treatment. Modern physicians are using emerging technologies such as content generation to advance the limits of medical possibilities with new treatments and insights that were once just a dream. At the same time, health systems have never been under such pressure to improve performance, reduce costs, and meet key challenges to safeguard their future. Although many of the examples described herein may relate to health care and services, it should be appreciated that the use of these examples is not intended to limit the scope of this disclosure. Such techniques may be equally applied to any suitable context and/or domain.

Traditional approaches for natural language generation (NLG) conventionally rely on three components:
(1) a content-planner that generates a content plane and selects the data to be expressed,
(2) a sentence planner that generates a sentence plan that specifies the structure of sentences or paragraphs based on the content plan, and
(3) a surface realizer that generates the final output based on the sentence plan. Recent studies proposed end-to-end models based on the encoder-decoder framework for structured-data-to-text generation. For example, encoder-decoders have been utilized to generate sports game summaries. An aligner model has been proposed that integrates the content selection mechanism into an encoder-decoder for generating weather forecast data from a set of database records. A conditional language model for biography summarization that would utilize an encoder-decoder framework. These end-to-end models produce fluent text on an ordered input with a fixed structure but have an inferior performance on disordered input. A major problem in open domain content generation is a distortion of facts and the truth in a content obtained by sequence-to-sequence models.

Previous techniques for content generation include Neural Content Planning (NCP). NCP refers to a two-stage model that includes content-planning that is configured to handle disordered input. First, NCP uses pointer networks to generate a content plan. Then, the generated content plan is used as the input of the encoder-decoder model (e.g., a text generator) to generate a description. However, this two-stage model suffers from error propagation between its content planning module and the text generator. The generated content plan may contain errors (e.g., missing one or more attributes that should be mentioned in the output) that lead the text generator to produce incomplete output. In an open domain setting, an encoder-decoder model significantly distorts facts as well, averaging from multiple sources of training data.

Some NLG systems are used in an attempt to personalize content for a given user. For example, conventional systems that are designed to provide targeted health information generally do not provide truly personalized content. A patient may have her own 'patient portal', which will record her medications, treatments, appointments, etc., but the actual content she receives will still be generic. In the worst case, the patient might click on a link to gain information about her diagnosed cancer and will receive a pop-up PDF document consisting of a lengthy brochure of 'boilerplate' text from a national cancer agency. Some NLG systems may be configured to generate new documents from pre-existing text through a process of reuse and revision. Such systems may start from an existing 'master document' that contains all the pieces of text that might be needed to tailor the document for any audience. Selections from the master document are made according to an individual use case (e.g., the individual patient profile), and then are automatically post-edited for personalized data, form, style, and coherence.

Recent data-driven methods have achieved good performances on various NLG tasks. However, most studies focus on surface descriptions of simple record sequences, for example, attribute-value pairs of fixed or very limited schema (e.g., E2E and WikiBio). In real-world cases for multi-row tables, it is often more desirable and plausible to provide descriptions involving higher-level logical inference across data records. For example, human readers would appreciate descriptions that can summarize or conclude information over the table records.

To produce such logical-level generations in high fidelity, it is not yet appropriate to provide only the table as the input in a real-world NLG system, due to the following: 1) Low Fidelity; Given only the table, it is challenging for existing neural models to produce logically correct generations involving reasoning and symbolic calculations, e.g., max, min, counting, averaging, etc. and 2) Uncontrollable content selection; Given a table, the space of logically entailed descriptions is exponentially large, due to vast number of combinations of different operations and arguments from the table, e.g., count, comparison, superlative, etc. It is hard and uncontrollable for neural models to decide a valid, favorable choice of logical selections solely based on the table, due to the difficulty of imposing high-level semantic constraints in the compositional generation process.

An implicit assumption of most NLG techniques is that the non-linguistic input information comes from knowledge bases with well-defined semantics. In practice, however, in most application domains where automatic textual descriptions are desperately required, such knowledge bases do not exist. For example, data intensive, clinical environments generate large amounts of clinical data that are not structured into logical forms within a knowledge base (or corpus of text). Data-to-text NLG is a recent extension of traditional NLG. Data-to-text NLG allows such naturally occurring data to be described linguistically. For example, such systems could generate summaries of multiple text-based health reports. One conventional system dynamically generates hypertext pages that explain treatments, diseases, etc. related to the patient's condition, using information in the patient's medical record as the basis for the tailoring. However, a complete summarization of ICU data is more complex, involving the processing of time series, discrete events, and short free texts. Thus, such systems can create a high volume of fake, counterfeit content which either needs to be repaired or rejected.

Another major problem in open-domain content generated by a deep-learning-based system is its meaninglessness. Although overall syntactic and logical structure, obtained via averaging of texts from the training dataset, looks plausible, and some individual phrase might make sense, almost each sentence is meaningless. The main advantage of such raw text is that it is original. The techniques discussed herein may utilize this raw text and correct and/or augment the raw text using information obtained from various sources, so that each sentence is truthful. The structure and content flow of the raw text may be utilized, while factoids may be collected from true texts mined from a knowledge base (e.g., the web, a corpus of text/documents, etc.) to correspond to the raw text.

The disclosed techniques relate to correcting/improving the truthfulness of sample text that was previously generated using deep learning techniques (e.g., text generated using an encoder-decoder model as described above). The disclosed techniques improve the end-to-end content generation process with fact-checking and correct fact substitution, to make the resulting content sound and trusted. The techniques discussed herein apply fact-checking to raw text to identify entities and phrases which are untrue. One or more queries are formed from these untrue phrases and search available knowledge bases (e.g., the Internet, a corpus of documents, etc.) for sentences that may be used to replace/correct and/or augment portions of the raw text while retaining the syntactic and logical structure of the original text.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, a "communicative discourse trees" or a "CDT" is a discourse tree that is supplemented with communicative actions. A communicative action is a cooperative action undertaken by individuals based on mutual deliberation and argumentation. Communicative discourse trees therefore combine rhetoric information with communicative actions.

As used herein, "communicative verb" is a verb that indicates communication. For example, the verb "deny" is a communicative verb.

As used herein, "communicative action" describes an action performed by one or more agents and the subjects of the agents.

As used herein, an "entity" has an independent and distinct existence. Examples includes objects, places, and persons. An entity can also be a subject or topic such as "electric cars," "brakes," or "France."

Moving on to the figures, FIG. 1 depicts an example of a computing environment for correcting raw text generated using deep learning techniques, in accordance with at least one embodiment. In the example depicted in FIG. 1, computing environment 100 includes one or more of computing device 102 and user device 104. Computing device 102 can implement an application (e.g., application 106). In some embodiments, the application 106 may be an autonomous agent (e.g., a chatbot) that engages in a conversation with user device 104 and uses one or more of the techniques disclosed herein to dialog in response to input provided by user device 104. As another example, application 106 can be a deep learning text generation component of computing device 102. Application 106 can be configured to receive data from user device 104 and generate raw text based on the received data. As another example, application 106 can be configured to generate raw text from any suitable text source, not necessarily data received from user device 104. Examples of computing device 102 are an example of the distributed system 1100 of FIG. 11 and client computing devices 1102, 1104, 1106, and 1108.

User device 104 can be any mobile device such as a mobile phone, smart phone, tablet, laptop, smart watch, and the like. As depicted, user device 104 user interface 108. User interface 108 may be configured to accept input from the user (e.g., via keyboard, microphone inputs, mouse inputs, touch screen, etc.) and provide data corresponding to that input to the computing device 102. In some embodiments, the user interface 108, or another component of the user device 104, may be configured to take vocal input and convert it to text prior to transmitting the text to computing device 102. The user device 104 may be configured to transmit text to the computing device 102. In other embodiments, the text may be obtained using a user interface (not depicted) provided by the computing device 102 and/or from a data store (not depicted) accessible to the computing device 102. Examples of suitable text include electronic text source such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

In some embodiments, user device 104 and computing device 102 may be communicatively connected via network 110. Network 110 can be any suitable public or private network including the Internet, a local area network, a virtual private network, or the like.

In some embodiments, the computing device 102 may include a classifier 112. Classifier 112 may be any suitable machine-learning model trained using training data 114 to provide output (e.g., an answer, generated text, etc.) in response to input (e.g., a question or other data submitted at user interface 108). Training data 114 can include any suitable data (e.g., question/answer pairs for good/bad answers, examples of good and/or bad text generations, etc.) with which the classifier 112 can be trained. In some cases, entities within text (e.g., input text, search results, etc.) are matched using ontology 116. Ontology 116 can be a domain-specific ontology (e.g., finance, law, business, medical, science, etc.). The ontology 116, among other features, can include formal specifications of various entities and relations among them. The ontology 116 may be utilized to identify synonymous words and/or phrases. In some embodiments, ontology 116 can be predefined and/or application 106 can build at least a portion of ontology 116 from an external source.

Deep Learning generated content 118 can be generated by deep learning generation module 120. In some embodiments, the deep learning generation (DLG) module 120 may employ any suitable deep learning generation technique to generate various raw text samples. As used herein, "deep learning techniques" refer to a type of machine learning and artificial intelligence (AI) that imitates the way humans gain certain types of knowledge by using algorithms that are stacked in a hierarchy of increasing complexity and abstraction. The DLG module be configured to collect a dataset including examples that form triples of a set of attributes, a content plan, and an entity description. The attributes for a target entity may be extracted by querying an online database (e.g., Wikidata, etc.) for triples that contain the target entity as the subject. A description is obtained from an online encyclopedia by extracting the first sentence of the online encyclopedia page corresponding to the target entity. The content plan can be extracted by finding the order of attributes in the description using string matching. The DLG module 120 may be configured to learn a content plan that helps it highlight the attributes in a proper order. The DLG module can include any suitable number and combination of components including at least one of: (1) an attribute encoder that encodes a set of attributes into a vector by computing the average of the linear transformation of each token embeddings of the attributes; (2) a pointer generator that generates a sequence of indexes (pointers) that represents the order of attributes in the description; (3) a content-plan generator that generates the content-plan based on the learned pointers; and (4) a content-plan encoder that encodes the learned content-plan to be used in the description generation module.

The content plan can be integrated into the attention mechanism of the encoder-decoder model. The same encoder that generated the content plan can be used to take input (i.e., attributes) as a bag of tokens to ensure that the same set of attributes with different orders have the same representation. An long short-term memory (LSTM) system can be employed by the DLG module 120 to encode the acquired content plan that maintains the proper sequence of attributes to capture the relationships between them. To incorporate the acquired content plan into the attention mechanism of the encoder-decoder model, the content-plan-based bag of tokens attention model may be employed by adapting the coverage mechanism to track the order of attributes in a content-plan for computing the attention of the attributes.

Any suitable portion of the DL generated content 118 may be generated by DLG module 120 or some portion of the DL generated content 118 may be previously stored and/or obtained from any suitable source.

Computing device 102 may include correction module 122. In some embodiments, correction module 122 may be configured to identify and implement one or more corrections to raw text provided as input (e.g., raw text generated by the DLG module 120, raw text retrieved from DL generated content 118, etc.). Operations for identifying and implementing these corrections are discussed in more detail with respect to FIGS. 2-10.

Figure 2:
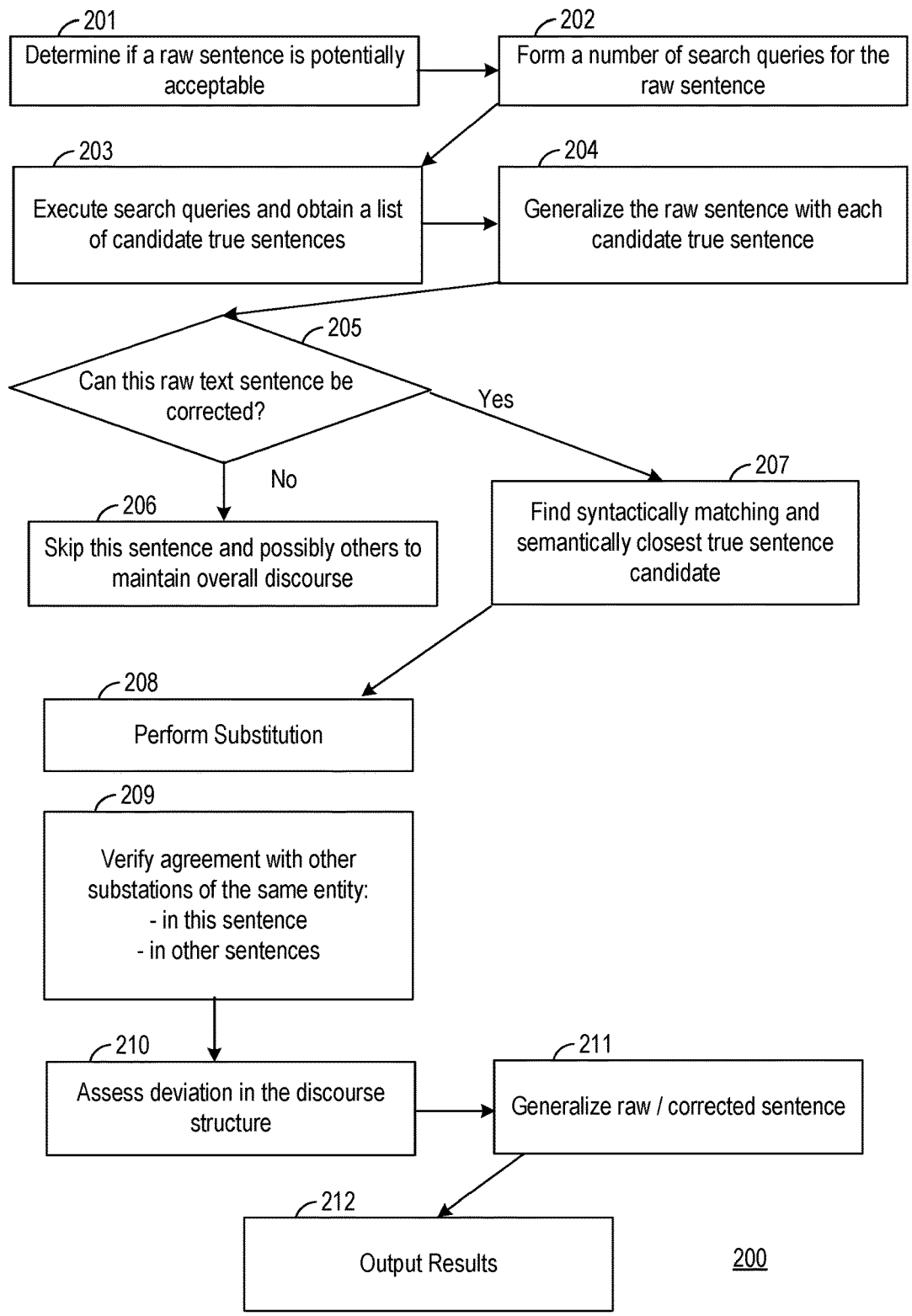
FIG. 2 depicts an example flow for a method performed by the correction module of FIG. 1, in accordance with at least one embodiment.

FIG. 2 depicts an example flow for a method 200 performed by the correction module 122 of FIG. 1, in accordance with at least one embodiment. Prior to performing the operations of method 200, raw text may be obtained (e.g., from DL generated content 118 of FIG. 1, from DLG module 120 of FIG. 1, or any suitable source). In some embodiments, the raw text may be obtained from the user device 104 via user interface 108 of FIG. 1. The raw text may be of any suitable length and content. As a non-limiting example, an instance of input text is provided below.

The method 200 may begin at 201, where it may be determined whether a raw sentence is potentially acceptable. The correction module 122 may be configured to apply a predefined syntactic set of criteria (or other predefined rule set) to determine one or more errors and/or if corrections should be obtained. If one or more errors exist, or it is determined that one or more corrections are to be obtained, the method 200 may proceed to 202.

At 202, a number of queries may be formed from a given raw text sentence. The raw text may include any suitable number of sentences, which in turn may include any suitable number of text fragments. Each fragment can correspond to an elementary discourse unit. To find relevant sentences from a knowledge base (e.g., the web, a corpus of text, etc.) with which the raw text sentence can be corrected, the correction module may develop one or more search queries from the raw text sentence using a discourse tree generated from the raw text sentence based at least in part on Rhetorical Structure Theory.

Figure 3:
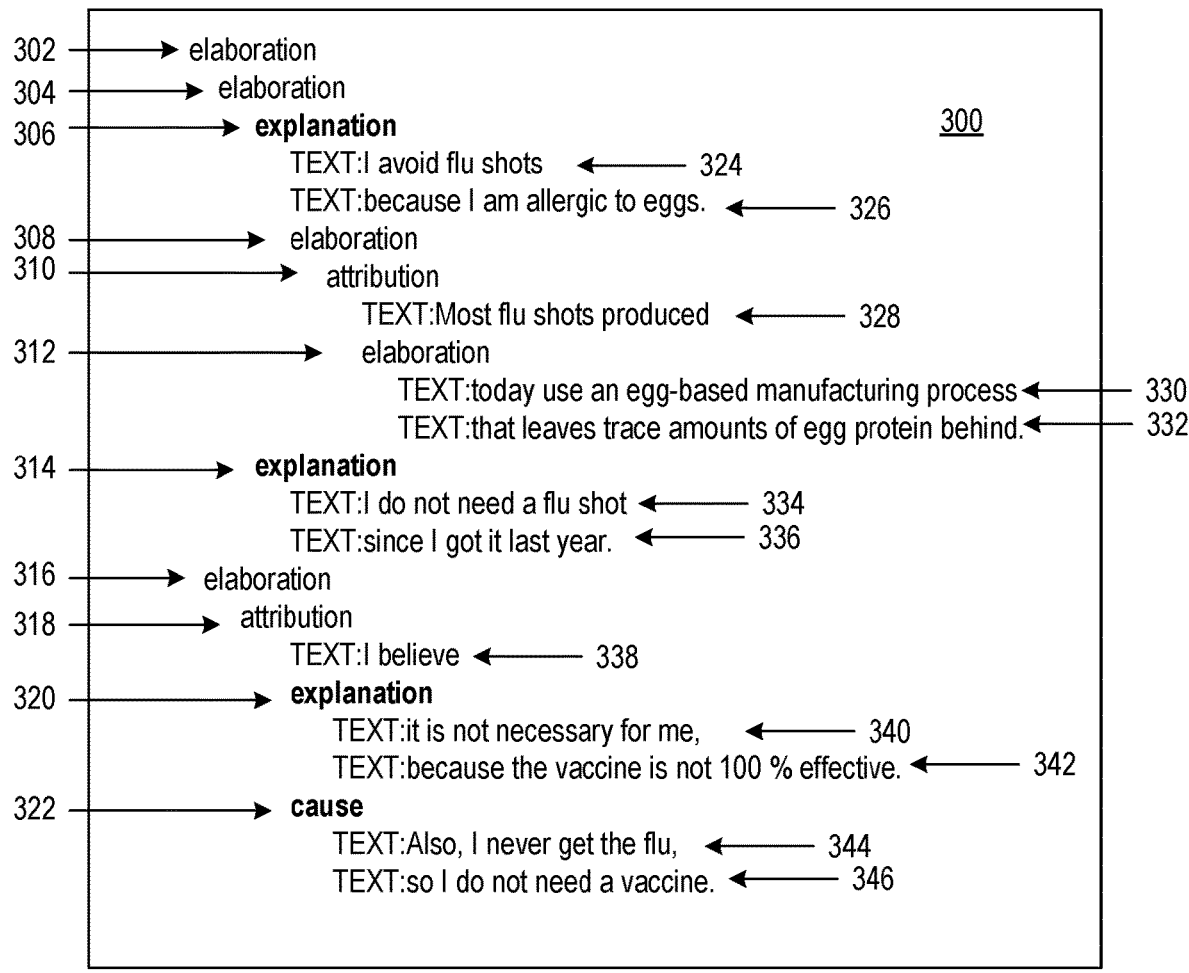
FIG. 3 depicts an example discourse tree, in accordance with at least one embodiment.

FIG. 3 depicts a text encoding 300 of a discourse tree generated (referred to as "discourse tree 300") from an instance of raw text, in accordance with at least one embodiment. By way of example only, the discourse tree 300 may be generated from the following text: I avoid flu shots because I am allergic to eggs. Most flu shots produced today use an egg-based manufacturing process that leaves trace amounts of egg protein behind. I do not need a flu shot since I got it last year. I believe it is not necessary for me, because the vaccine is not 100% effective. Also, I never get the flu, so I do not need a vaccine. The discourse tree 300 may be generated from the input text described above based at least in part on Rhetorical Structure Theory.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. Some rhetorical relations are provided below. However, this list is not intended to be exhaustive.

| Relation Name | Nucleus | Satellite |
| --- | --- | --- |
| Antithesis | ideas favored by the author | ideas disfavored by the author |
| Attribution | a statement | information describing additional information attributed to the statement |
| Background | text whose understanding is being facilitated | text for facilitating understanding |
| Cause | a statement | information describing a causal link between the statement and an assertion |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |

| Relation Name | Nucleus | Satellite |
|---|---|---|
| Evidence | a claim | information intended to increase the reader's belief in the claim |
| Explanation | a statement | information describing one or more reasons for the statement |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a re-expression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations, but other relations do not carry a definite selection of a nucleus. Examples of such relations are shown below.

| Relation Name | Span | Other Span |
|---|---|---|
| Contrast | One alternate (unconstrained) | The other alternate (unconstrained) |
| Joint | (unconstrained) | (unconstrained) |
| List | An item | A next item |
| Sequence | An item | A next item |

Returning to FIG. 3, the discourse tree 300 may be generated based on parsing the input text. Discourse tree 300 may include any suitable combination of the rhetorical relations (also referred to as "rhetorical relationships") described above. For example, discourse tree 300 may include rhetorical relationships 302-322. Discourse tree 300 may further include a number of text (e.g., elementary discourse unit (EDU) 324-346). Each rhetorical relation describes a rhetorical relationship between two or more EDUs. By way of example, rhetorical relation 314 may describe a rhetorical relationship (e.g., "explanation") between EDU 334 and EDU 336.

Any suitable method for constructing the discourse tree 300 may be utilized. One example method for constructing discourse tree 300 may include the following operations:
(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

In some embodiments, the correction module 122 may generate a discourse tree or a communicative discourse tree of the raw sentence.

Figure 4:
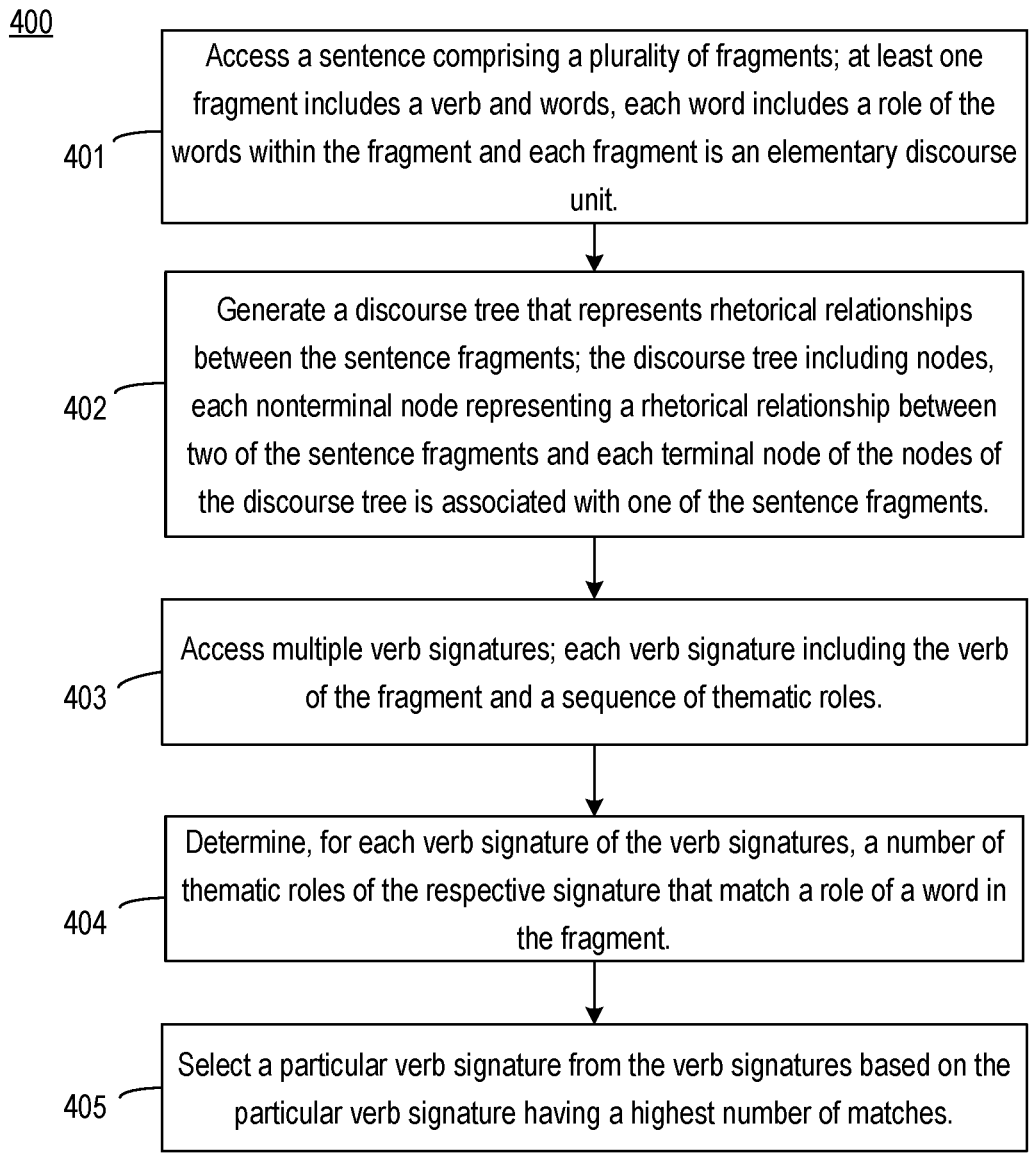
FIG. 4 depicts a flow for a method for generating a communicative discourse tree, in accordance with at least one embodiment.

FIG. 4 depicts a flow for a method for generating a communicative discourse tree, in accordance with at least one embodiment. In some embodiments, utilizing communicative discourse trees to generate the queries enables improved search engine results.

At block 401, process 400 involves accessing a sentence including fragments (e.g., a raw sentence). At least one fragment includes a verb and one or more words and each word includes a role of the words within the fragment, and each fragment is an elementary discourse unit.

In some embodiments, the correction module 122 of FIG. 1 may identify that the sentence includes several fragments. Each fragment may include a verb, although, a fragment need not include a verb.

At block 402, process 400 involves generating a discourse tree that represents rhetorical relationships between the sentence fragments. For example, the correction module 122 may generate the discourse tree discussed in connection with FIG. 3. The discourse tree may include nodes, each nonterminal node representing a rhetorical relationship between two of the sentence fragments and each terminal node of the nodes of the discourse tree is associated with one of the sentence fragments.

At block 403, process 400 involves accessing multiple verb signatures. For example, the correction module 122 may access a list of verbs, (e.g., from VerbNet, a predefined list of verbs, etc.). Each verb may match or may relate to the verb of the fragment. For example, if a fragment included the verb "deny," the correction module 122 may access a list of verb signatures that relate to the verb deny.

Each verb signature may include the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example, "the teacher amused the children" has a different signature from "small children amuse quickly." For the first fragment, the verb "deny," application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. In some embodiments, correction module 122 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 404, process 400 involves determining, for each verb signature of the verb signatures, a number of thematic roles of the respective signature that match a role of a word in the fragment. For example, if a fragment of the raw text sentence includes the verb "deny," the correction module 122 may determine that the verb "deny" has only three roles, "agent", "verb" and "theme."

At block 405, process 400 involves selecting a particular verb signature from the verb signatures based on the particular verb signature having a highest number of matches. For example, a fragment "the rebels deny . . . that they control the territory" can be matched to verb signature deny "NP V NP", and "control" is matched to control (rebel, territory). Verb signatures are nested, resulting in a nested signature of "deny (rebel, control (rebel, territory))." Each selected verb signature is associated with a corresponding fragment to complete the communicative discourse tree.

Returning to FIG. 2 at 202, once a discourse tree (DT) (or communicative discourse tree (CDT)) is generated for the raw text sentence(s) in the manner described above in connection with FIGS. 3 and 4, the correction module 122 can identify any entities within the raw text fragments and then uses the entities to generate one or more queries. Identification of one or more entities can be determined using the DT/CDT generated from the raw text sentence. In an example, significant noun phrases have three or more keywords, e.g., two or more modifiers for a noun, or an entity, such as a proper noun. A main entity can be identified by traversing the DT/CDT of the raw text from the top (root) down and identifying the first noun phrase in the tree.

In an example, a raw text sentence is used as a seed. An example of a raw text sentence includes "there is no reason why you can't retire in ten years if you had been a rational investor and nota crazy trader." A discourse tree (e.g., one similar in nature as discourse tree 300 of FIG. 3) may be generated using RST and a noun phrase that is closest to the root (or the top) of the parse tree may be identified. Here, the main entity may be identified as "rational investor."

The correction module 122 may identify a main entity as retirement in the form of the verb retire. This main entity is constrained by the noun phrase that follows rational investor. To form the second query, rational investor and the next noun phrase not a crazy trader are combined. In some cases, a query with four to five keywords is used. Continuing the example, the following queries are formed for a search engine API:

(Q1)+retire+rational+investor
(Q2)+rational+investornot+crazy+trader

As another example, the correction module 122 may identify one or more entities by traversing the discourse tree and comparing the nodes to the ontology 116 which may identify one or more entities and relations between them. Using the entities identified from the ontology 116 as existing in the raw text, the correction module 122 may execute a predefined rule set for generating one or more queries from those entities.

Different approaches can be used to form a query from a raw text fragment. For example, forming a query can include constructing a parse tree from the nucleus elementary discourse unit. A parse tree includes nodes, e.g., for a noun phrase or a verb phrase. An example of a parse tree is provided in FIG. 5. Correction module 122 of FIG. 1 may select, from the nodes, a node that represents either (i) a noun, (ii) a verb, or (iii) adjective. Correction module 122 can then replace the identified word with a question word to generate a query. Examples of question words are what, where, whom, who, how, or whose. Other question words are possible. Table 1, below, lists some examples of how various parts of a parse tree can be replaced with question words.

TABLE 3 question word insertion
Using Rhetorical Relations to Guide Query Formation

| Node(s) Deleted | Formed Query |
| --- | --- |
| Noun Phrase (NP)- | Noun and preposition of noun are replaced<br>Example:<br>"The president of US announced a . . . "<br>Substitution: "The president of US" -> Who<br>Query: Who announced . . . ? |
| Verb Phrase (VP) | Verb and verb subject are replaced with what/when/where<br>Example:<br>The president of US announced a new series of projects to improve the security of state<br>VP = announced a new series of projects . . .<br>=> Verb + Verb subject => announced what/when/where<br>Substitution: Verb itself -> what<br>Query: what did the president announce |

TABLE 3-continued question word insertion
Using Rhetorical Relations to Guide Query Formation

| Node(s) Deleted | Formed Query |
|---|---|
| Predicate + Subject | President announced => subject + predicate + VP (predicate)<br>Wh part = VP-verb itself = for whom/to what audience/for what purpose<br>Substitution: President announce for X, X-> What . . . ?<br>Query: President announced for whom?<br>President announced to which of his supporters<br>President announced for what reason |
| Verb phrase + noun phrase | Formed question = noun phrase with Wh word<br>Verb phrase = Announced on the summer evening<br>Noun phrase = the summer evening<br>Substitution: noun phrase => when/what/where<br>Query: when did announce?<br>What did announce, where did announce |
| Verb phrase, considering Verb Net roles | Phrase = "Announced about relationship with China"<br>Verb Net (Announced): Who, To Whom, What, When, Where)<br>Select role: When<br>Query: When announced about relationship with China? |
| Communicative verb phrase with its subject | Phrase: said that the president announced<br>Subject = the president announced<br>Substitution "president" -> Who<br>Query: who announced? |
| Possessive noun phrase | Phrase = President's announcement<br>Substitution President's -> whose<br>Query: Whose announcement?<br>Phrase = President of China<br>Substitution = President of China => president of what<br>Query: President of what . . . announced? |

Figure 5:
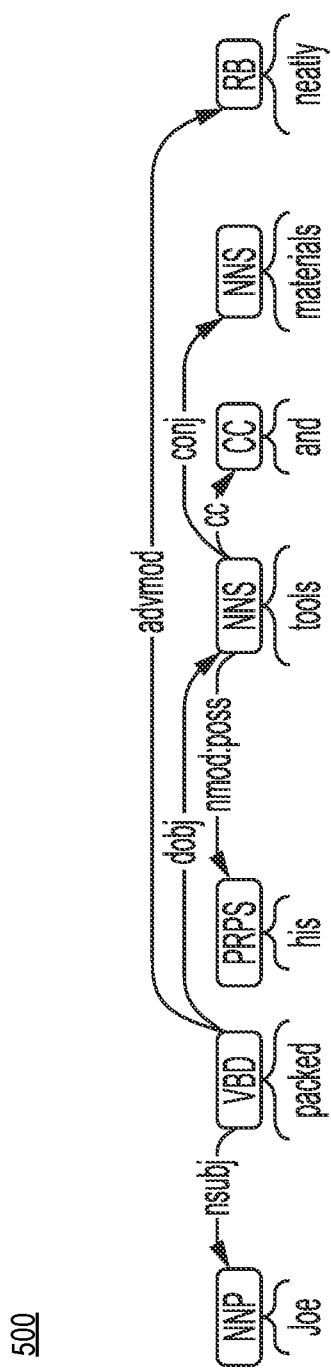
FIG. 5 illustrates an exemplary parse tree in accordance with an aspect.

FIG. 5 illustrates an exemplary parse tree in accordance with an aspect. FIG. 5 includes parse tree 500, which represents the sentence: "Joe packed his tools and materials neatly." Parse tree 500, generated from a raw text sentence, can be used form queries. Parse tree 500 can also be referred to as a syntax tree. The parse tree 500 is a tree representation of the abstract syntactic structure of the sentence. The parse tree 500 represents the syntax of the sentence of the input text described above. The trees describe the sequence of subject, verbs, nouns, noun phrases, and the like are sequenced in a given sentence. Each node of the parse tree 500 corresponds to a word in the sentence. Each terminal node corresponds to a word in the sentence and can be associated with a tag/label that identifies the word as a particular syntactical component. Such labels can include, but are not limited to:

| Label | Syntactical Component |
|---|---|
| NN | Singular Noun |
| NNS | Plural Noun |
| NNP | Proper Noun |
| VBD | Past tense verb |
| VBZ | 3rd person singular present tense verb |
| PRP | Pronoun |
| JJ | Adjective |
| IN | Preposition |
| DT | Determiner |
| VBN | Past participle |

-continued

| Label | Syntactical Component |
|---|---|
| Punct | Punctuation |
| VBP | Non-3rd person singular present tense verb |
| PRPS | Possessive pronoun |

Phrases of the sentence can be similarly tagged/associated with labels identifying the phrase as a particular syntactical component (e.g., noun phrase, verb phrase, prepositional phrase, etc.). A parse tree can include non-terminal nodes which connect terminal nodes (e.g., two terminal nodes). The non-terminal node may also be associated with tags/labels that correspond to the parts of speech. These tags/labels may identify syntactic relationships between terminal nodes.

To generate a query from a raw text sentence, the correction module 122 can build a parse tree and then identify nouns, verbs and adjectives in the parse tree. Correction module 122 can substitute nodes of the parse tree with a question word, thereby reducing the parse tree. For every selected node, correction module 122 can select an appropriate question word by using the following rules: substituting "who" or "what" for a noun, "what . . . do" for a verb, or "which way" or "how is" for an adjective. As can be seen in Table 2, in an example, the sentence can be transformed into the question "What did Joe pack neatly?" Correction module 122 can replace the noun "tools and materials" and the related word "his," leaving "Joe packed neatly." Correction module 122 can then insert the question word "what," resulting in "What did Joe pack neatly?"

TABLE 2 transforming a statement into a question
Forming a Query from "Joe packed his tools and materials neatly."

| Node(s) Deleted | Resulting Question |
| --- | --- |
| Tools and materials (NNS) | What did Joe pack neatly |
| Joe (NNP), his (PRP$) | Who packed tools and materials neatly? Whose tools and materials were packed neatly? |
| Neatly (RB) | How did Joe pack? |

In an aspect, a type of rhetorical relation that is connected to a particular nucleus discourse unit can be used as a hint to determine an appropriate question word. For example, the rhetorical relation "elaboration" forms a "what" question/query, a "background" relation forms a "what" question, and a rhetorical relation "cause" yields a "why" question.

TABLE 3 rhetorical relation to question word mapping
Using Rhetorical Relations to Guide Selection of Question Words

| Rhetorical Relation | Question Words |
| --- | --- |
| elaboration | "what" |
| background | "what" |
| cause | "why", "what caused" Example: nucleus "I fell on the pavement" and satellite "since it was wet after he rain." Question: "Why did I fall?" |
| attribution | "how" Example: "how do you know that? Example: "According to CNN, dogs eat cats as they do not like diversity in animals." Question: "how do ... know that dogs eat cats?" "What makes you believe ... ?" "From whom do you know ... ?" "Who told that?" |
| Temporal sequence | After/before what ... ? What happened after what? |
| Enablement | "Which way do you do ... " "By which means?" "What did ... do to ... " |
| Condition | "On what condition?" |
| Concession | "But why?" "How come?" |
| Purpose | "For what?" "For which purpose?" |

Returning to FIG. 2, at 203, the one or more search queries generated at 202 using one or more of the techniques discussed above, may be executed to obtain a list of candidate true sentences. For example, the one or more queries may be provided (e.g., via a search API) to one or more knowledge bases. An example of a knowledge base may include Wikipedia®, Bing®, Google®, and the like. A knowledge base may additionally, or alternatively, include a corpus of documents (e.g., text) accessible to the correction module 122. A set of search results may be obtained based on executing the search queries against the knowledge base(s). Each sentence (or some number of sentences) of one or more search results may serve as a candidate true sentence with which the raw text sentence can be corrected.

At 204, the raw text sentence and each candidate true sentence can be generalized. That is the syntactic and semantic representations of the raw text sentence may be mapped to syntactic and semantic representations of each candidate sentence to determine if a given candidate sentence may be used to correct/replace an entity of the raw text sentence. The process performed at 204 may be referred to as "syntactic/semantic alignment."

FIG. 6 depicts an example flow for a method 600 for aligning, using syntactic/semantic alignment, a raw text sentence with a candidate true sentence obtained from a knowledge base (and/or corpus of text), in accordance with at least one embodiment. Correction module 122 can implement method 600 on computing device 102 of FIG. 1. In some cases, some of the operations in method 600 may not be necessary, and therefore are not performed. It will be appreciated that method 600 can repeat additional times in the event that a candidate true sentence (e.g., a sentence from one of the search results obtained at 203 of FIG. 3) is not deemed to be sufficiently appropriate or accurate.

Further, method 600 can iterate multiple times to determine whether a candidate true sentence aligns with a raw text sentence sufficiently to provide replacement fragments for the raw text sentence.

At operation 602, method 600 involves creating a first semantic tree from a raw text sentence and second semantic tree from a candidate true sentence. In some cases, the raw text sentence is converted into normalized or sentence form prior to the creation of the semantic tree. In an example, the raw text sentence can originate from a content corpus (e.g., the DL generated content 118) or can be created via a deep learning system (e.g., via deep learning generation module 120). A first semantic tree is generated for a raw text sentence and a second semantic tree is generated for the candidate true sentence. A semantic tree refers to a generic representation of semantic information. As discussed below, different semantic representations can be used such as Abstract Meaning Representation (AMR).

A semantic tree (or graph) includes nodes and edges. The nodes represent entities (e.g., a place, person, or thing). Each edge represents a relationship between two of the entities. Information from a semantic tree can alternatively be represented by text.

FIG. 7 depicts an example semantic representation (e.g., a flattened representation of a semantic tree, also called an AMR graph) of a text sample, in accordance with at least one embodiment. The semantic representation of FIG. 7 may be referred to as "semantic tree 700." Semantic tree 700 represents the following text: "As of Monday morning, there have been 21 people from Nghe. An suspected of missing in Britain, head of Nghe. Police Nguyen Huu Cau told local media on the sidelines of the ongoing biannual meeting of the country's top legislature." Semantic representation 700 is an AMR graph. AMR graphs are intended to abstract away the syntactic representations. For instance, sentences which are similar in meaning are assigned the same AMR representation (even if the sentences are not identically worded). AMR representations are generally intended to work only with the English language. An AMR graph is constructed by identifying sentences or fragments of sentences with known meanings and then substituting the known meaning into the graph.

Returning to FIG. 6, at 604, method 600 involves identifying common subtrees between the first semantic tree generated from the raw text sentence and the second semantic tree generated from the candidate true sentence. One or more common subtrees may be identified between the first semantic tree and the second semantic tree. Different approaches can be used to identify a common subtree, including aligning the first and second semantic trees. For instance, a common subtree includes nodes, each of which represents an entity that is common between the first semantic tree and the second semantic tree and has edges between the nodes that represent a semantic relationship between the entities. The nodes are shared in the first semantic tree and the second semantic tree.

For example, matching a semantic tree for a raw text sentence to a semantic tree for an candidate true sentence can be broadly classified into three main steps: (1) locating the topic entity in the raw text sentence, (2) finding the main relationship between the candidate true sentence and the topic entity, and (3) expanding a query graph with additional constraints that describe properties the answer needs to have, or relationships between the answer and other entities in the raw text sentence.

A sentence fragment can be mapped to a logical form in λ-calculus and is semantically related to k-dependency-based compositional semantics (DCS) is defined. For instance, for an expression 'citizens who live in Boston' regular λ-calculus gives λx.∃e.PlacesLive (x, e)∧Location (e, Boston) and λ-DCS gives PlacesLive.Location.Boston. Hence, DCS attempts to remove explicit use of variables; it makes it similar in spirit to dependency-based compositional semantics.

Matching a semantic parse tree for a raw text sentence against that for a candidate true sentence is formulated as query graph generation as state transitions from a seed alignment towards a full alignment. Each state is a candidate mapping between parses such as AMR(Q)→AMR(A) in the query graph representation and each action defines a way to grow the alignment. The representation power of the alignment of a pair of semantic parses is thus controlled by the set of allowed alignment actions applicable to each state.

When aligning an AMR(V,E) against syntactic dependency parse tree T(U,F) or another AMR graph, the costs of aligning each node v in AMR with each node n in T are computed. The cost of aligning two nodes takes into account the graphlet degree signature similarity between them, modified to reduce the cost as the degrees of both nodes increase, because higher degree nodes with similar signatures provide a tighter constraint than correspondingly similar low degree nodes. In this way, we align the densest parts of the AMR graph first.

Graphlets are defined as small connected non-isomorphic induced subgraphs of a large graph such as an AMR graph. Graphlet degree vectors (signatures) and signature similarities are introduced to support graph alignment procedure. This measure generalizes the degree of a node, which counts the number of edges that the node touches, into the vector of graphlet degrees, or graphlet degree signature, counting the number of graphlets that the node touches at a particular orbit, for all graphlets on 2 to 5 nodes. The resulting vector of seventy-three coordinates is the signature of a node that describes the topology of a node's neighborhood and captures its interconnectivities out to a distance of 4. The graphlet degree signature of a node provides a highly constraining measure of local topology in its vicinity and comparing the signatures of two nodes provides a highly constraining measure of local topological similarity between them.

The signature similarity is computed as follows. For a node u in graph G, $u_i$ denotes the $i^{th}$ coordinate of its signature vector, i.e., $u_i$ is the number of times node u is touched by an orbit i in G. The distance $D_i(u,v)$ between the $i^{th}$ orbits of nodes u and v is defined as:

$$D_i(u, v) = \omega_i \times \frac{|\log(D_i + 1) - \log(v_i + 1)|}{\log(\max(\{u_i, v_i\} + 2))}$$

where $w_i$ is the weight of orbit i that accounts for dependencies between orbits. The total distance D(u,v) between nodes u and v is defined as:

$$D(u, v) = \frac{\sum_{i=0}^{72} D_i}{\sum_{i=0}^{72} \omega_i}$$

The distance D(u,v) is in [0, 1), where distance 0 means that signatures of nodes u and v are identical. Finally, the signature similarity, S(u,v), between nodes u and v is:

$$S(u,v)=1-D(u,v)$$

A higher signature similarity between two nodes corresponds to a higher topological similarity between their extended neighborhoods up to the distance of four. Number four corresponds to a typical maximum number of arguments of a verb node of an AMR graph.

Let deg(v) be the degree of a node v in AMR, let $\max_{deg(AMR)}$ be the maximum degree of nodes in AMR, and let S(v, u) be the graphlet degree signature similarity of nodes v and u, and let α be a parameter in [0, 1] that controls the contribution of the node signature similarity to the cost function (that is, 1−α is the parameter that controls the contribution of node degrees to the cost function), then the cost of aligning nodes v and u is computed as:

$$C(v, u) = 2 - ((1 - \alpha) \times \frac{deg(v) + deg(u)}{\max\_deg(G) + \max\_deg(H)} + \alpha \times S(v, u))$$

A cost of 0 corresponds to a pair of topologically identical nodes v and u, while a cost close to 2 corresponds to a pair of topologically different nodes.

The graph alignment algorithm chooses as the initial seed a pair of nodes v and u from AMR and T which have the smallest cost. Ties are broken randomly. Once the seed is found, we build the spheres of all possible radii around nodes v and u. A sphere of radius r around node v is the set of nodes $S_{AMR}(v, r)=\{x \in AMR: d(v, x)=r\}$ that are at distance r from v, where the distance d(v, x) is the length of the shortest path from v to x. Spheres of the same radius in two networks are then greedily aligned together by searching for the pairs (v u): v'∈$S_{AMR}$(v, r) and u'∈$S_T$(u, r) that are not already aligned and that can be aligned with the minimal cost.

When all spheres around the initial seed (v, u) have been aligned, other nodes in both AMR and T are still unaligned. The same algorithm is repeated on a pair of graphs ($AMR^p$, $T^p$) for p=1 . . . 3 and attempt to identify a new seed again, if necessary. The graph $AMR^p$ is defined as a new graph $AMR^p$=(V, $E^p$) having the same set of nodes as AMR and having (v, x)∈$E^p$ if and only if the distance between nodes v and x in AMR is less than or equal top. In other words $d^{AMR}$(v, x)≤p. $AMR^1$=AMR. Using $AMR^p$ (p>1) aligns a path of length p in one graph to a single edge in another graph, which is analogous to allowing "insertions" or "deletions" in a sequence alignment. The alignment procedure is stopped when each node from AMR is aligned to exactly one node in T.

At 606, process 6 involves calculating a semantic alignment score from a sum of sizes of each of the common subtrees (e.g., common subtrees of the semantic tree for the raw text sentence and the semantic tree for the candidate true sentence). The semantic alignment score represents a sum of the sizes of the common subtree. The size of a common subtree is equal to the number of nodes in the common subtree. For instance, if a first subtree has four nodes and a second subtree has six nodes, and there are two subtrees, then the semantic alignment score is ten. A largest common subtree can be a maximal common subtree. A maximal common subtree indicates a best alignment between the semantic trees and is created from a collection of trees $T_1 \ldots T_m$ each containing n leaves. The leaves of these trees are given labels from a set L where |L|=n so that no pair of leaves in the same tree share the same label. Within the same tree the labelling for each leaf is distinct. A maximal common subtree is a largest subset $L' \subset L$ such that the minimal spanning subtrees containing the leaves in L' of $T_1|S, \ldots T_m|S$ are the same while preserving the labelling.

At operation 608, method 600 involves forming a first syntactic tree for the raw text sentence and a second syntactic tree for the candidate true sentence. Each syntactic tree includes syntactic nodes that represent a word and an associated part of speech. FIG. 5 above, is an example of a syntactic tree.

At operation 610, method 600 involves identifying, between the first syntactic tree and the second syntactic tree, a number of common syntactic nodes. Different approaches can be used. For instance, a machine-learning based approach can identify common nodes. In this case, the syntactic trees are provided to a trained machine-learning model, which identifies and outputs the common syntactic nodes. The common syntactic nodes are connected between the first and second syntactic trees.

In other cases, an algorithmic approach can be used such as syntactic generalization. In an example, the first syntactic tree and second syntactic tree can be merged into a common tree. Within the common tree, a noun or an entity common to both syntactic trees is identified.

To measure of similarity of abstract entities expressed by logic formulas, a least-general generalization is proposed for a number of machine-learning approaches, including explanation based learning and inductive logic programming. Least general generalization is also called anti-unification. For two words of the same part of speech (POS), their generalization is the same word with the POS. If the lemmas for the two words are different, but the POS is the same, then the POS remains in the result. If lemmas are the same, but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation but indicate the above instantiation of predicates with arguments.

Consider the following two sentences "camera with digital zoom" and "camera with zoom for beginners." To express the meanings, the following logic predicates are used:

camera(name_of_feature, type_of_users) and
zoom(type_of_zoom).

Note that this is a simplified example, and as such, may have a reduced number of arguments as compared to more typical examples. Continuing the example, the above expressions can be represented as:

camera(zoom(digital), AnyUser), and
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization (A') of two noun phrases as: {NN-camera, PRP-with, [digital], NN-zoom [for beginners]}. The expressions in square brackets are eliminated because they occur in one expression, but do not occur in the other. As a result, obtain {NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions, so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*, POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."
"Digital camera was a good buy today, first Monday of the month."

Generalization is {<JJ-digital, NN-camera>, <NN-today, ADV, Monday>}, where the generalization for noun phrases is followed by the generalization for an adverbial phrase. Verb buy is excluded from both generalizations because it occurs in a different order in the above phrases. Buy—digital—camera is not a generalization phrase because buy occurs in different sequence with the other generalization nodes.

Returning to FIG. 6, at operation 612, method 600 involves calculating a syntactic alignment score based on the number of common syntactic nodes. In general, a greater number of alignments means a greater similarity and therefore a higher score. An ideal answer is when a candidate true sentence and raw text sentence are similar (e.g., common words organized in the same manner). In this respect, aligning the structure of the trees is an improvement over simply identifying common keywords between raw text sentence and answer.

The semantic and syntactic alignment scores determined as part of method 600 may be subsequently used to identify/ select a candidate true sentence for use in correcting a raw text sentence. By way of example, responsive to determining that a sum of the semantic alignment score and the syntactic alignment score is greater than a threshold and selecting the candidate true sentence to correct aspects of the raw text sentence. A threshold can be used if there is only one candidate true sentence. But if there is more than one candidate true sentence, then the semantic and syntactic alignment scores for the different candidate true sentences can be compared and a candidate true sentence (e.g., the highest scored candidate true sentence) can be selected to correct aspects of the raw text sentence.

Returning to FIG. 2, each candidate true sentence obtained from the search results may be generalized with the raw text sentence such that each candidate true statement has an associated semantic alignment score and syntactic alignment score associated with it. These scores may collectively indicate a degree of by which a candidate true statement is appropriate to provide fragments with which the raw text sentence may be corrected. Said another way, the scores may be used to determine which candidate is an optimal candidate (e.g., where substituting entities from the optimal candidate would modify the syntactic raw text sentence structure to the least degree).

At 205, a determination may be made as to whether the raw text sentence may be corrected. By way of example, if none of the candidate true statements are assigned semantic/syntactic scores that breach corresponding threshold values, then the raw text sentence may be determined to not be correctable, and the sentence may be skipped at 206 to maintain overall discourse. However, is the raw text sentence is correctable, the method 200 may proceed to 207.

At 207, a candidate true statement may be selected (e.g., based on the semantic/syntactic scores assigned at 204). For example, a syntactically matching and semantically closest true sentence candidate may be selected. For example, a candidate true statement having a highest combined semantic alignment score and a highest syntactic alignment score may be selected.

At 208, entity and/or phrase substitutions may be made using entities and/or phrases of the selected candidate true sentence. Entities and/or phrases of the candidate true sentence may be used to replace and/or augment the entities and/or phrases of the raw text sentence. If multiple sentences are corrected, substitutions should be propagated according to the structure of coreferences in the raw text. Overall discourse structure must be assessed in comparison with that of the raw text as well. Table 4 below illustrates the linguistic and fact-based data taken from each source (e.g., from the raw text sentence or from the selected true sentence).

TABLE 4

| Raw sentence | True sentence |
|---|---|
| Seed is used to generate raw content | |
| Generated Text by DL | Real Text obtain from sources like web or intranet, or specific web domains |
| Syntactic flow, if possible | Syntactic flow, if required |
| Discourse flow, if possible | Discourse flow, if required |
| Coreference structure, if possible | Coreference structure, if required |
| Logical flow, if possible | |
| Original "idea" | Existing idea, if the original idea is too distant from the topic |

TABLE 4-continued

| Raw sentence | True sentence |
|---|---|
| Entities are most likely wrong and need to be substituted | Entities |
| Actions can be retained, if confirmed by | Phrases |

At 209, the correction module 122 may verify agreement with other substations of the same entity in the raw text (now corrected text). In some embodiments, this agreement may be assessed at the level of the whole corrected text (e.g., all of the raw/corrected text sentences obtained from the original raw text), paragraphs, sentences, and phrases.

At 210, a set of predefined rules may be applied to assess whether the discourse structure of the corrected text deviates from the discourse structure of the raw text sentence (e.g., over a predefined threshold value indicating deviation).

Assessing deviation of the discourse structure can include generalizing the raw and corrected sentence. At 211, the raw and corrected text sentence can be generalized to identify whether the corrected text sentence deviates to far from the raw text sentence. By way of example, a CDT may be generated for each of the raw text sentence and the corrected text sentence. The correction module 122 may compare the original CDT for the raw text sentence and the resultant CDT for the corrected text sentence. In some embodiments, the correction module 122 may enforce that non-trivial rhetorical relations from the raw text CDT must be retained (addressed) in the corrected text CDT. If so, then the correction may be considered to properly retain the discourse structure. However, if the corrected text CDT contain different nontrivial relations, or in a totally different order, the correction module 122 can confirm that the correction procedure broke the discourse structure and may, in some cases, discard the corrections.

At 212, output may be generated. If the corrections/substitutions performed were found to be acceptable (e.g., the corrected entities agree with similar entities in the same sentence/other sentences, and the discourse structure of the raw text sentence was maintained), the output may include the corrected raw sentence, and/or an indication that the correction was successful and/or an indication of the particular corrections made. Conversely, if the corrections/substitutions performed were found to be unacceptable (e.g., the corrected entities did not agree with similar entities in the same sentence/other sentences, or the discourse structure of the raw text sentence was not sufficiently maintained), the output may include the raw text sentence and/or an indication that the correction was unsuccessful.

Moving on, a specific example will be provided with respect to FIGS. 8 and 9.

FIG. 8 depicts an example raw text sample, in accordance with at least one embodiment. Raw text 800 may be generated (e.g., by the DLG module 120 of FIG. 1) utilizing any suitable deep-learning generation techniques any may include any suitable number of sentences. In the example provided in FIG. 8, raw text 800 includes 7 sentences. Some sentences need entity substitutions and some needs total rewrite by finding the closest available sentence from the source inheriting the syntactic structure. Raw text 800 illustrates many internal inconsistencies including, but not limited to, inconsistency 802 and inconsistency 804.

The method 200 of FIG. 2 may be performed for each sentence of raw text 800.

FIG. 9 depicts the raw text sample of FIG. 8 (e.g., raw text 800) as corrected using one or more true statements obtained from a knowledge base (and/or corpus of text), in accordance with at least one embodiment. The corrected text 900 includes 7 sentences corresponding to the 7 sentences of raw text 800. Each sentence of correct text 900 is numbered for identification.

Raw sentence 1 may be obtained and the correction module 122 may determine whether this raw sentence is potentially acceptable. The correction module 122 may be configured to apply a predefined set of syntactic criteria (or other predefined rule set) to determine one or more errors and/or if corrections should be obtained. A number of queries may be formed from raw sentence 1. The raw sentence 1 include a number of text fragments. Each fragment can correspond to an elementary discourse unit. The correction module 122 may generate or more search queries using one or more of the techniques discussed above in connection with FIG. 2. The search query or queries may be executed to obtain a list of candidate true sentences. Candidate true sentence 1A is an example of a candidate true sentence obtained through executing a search query generated from raw sentence 1. For example, the one or more queries may be provided (e.g., via a search API) to one or more knowledge bases. An example of a knowledge base may include Wikipedia®, Bing®, Google®, and the like. The knowledge base may additionally, or alternatively, include a corpus of documents (e.g., text) accessible to the correction module 122. A set of search results may be obtained based on executing the search queries against the knowledge base(s).

Raw sentence 1 and each candidate true sentence can be generalized using the method 600 discussed above in connection with FIG. 6. That is the syntactic and semantic representations of the raw sentence 1 may be mapped to syntactic and semantic representations of each candidate sentence (e.g., syntactic and semantic representations of candidate true sentence 1A) to determine if a given candidate sentence may be used to correct/replace an entity of the raw text sentence.

A determination may be made as to whether the raw text sentence may be corrected. By way of example, if none of the candidate true statements (including candidate true statement 1A) are assigned semantic/syntactic scores that breach corresponding threshold values, then raw sentence 1 may be determined to not be correctable, and the sentence may be skipped to maintain overall discourse. However, if the raw sentence is deemed to be correctable, a candidate true statement may be selected (e.g., based on the semantic/syntactic scores assigned via the method 600). In the example provided in FIG. 9, candidate true statement 1A may be selected from a set of candidates based at least in part on having a highest combined semantic alignment score and a highest syntactic alignment score of all candidate true statements.

Entity and/or phrase substitutions may be made using entities and/or phrases of candidate true sentence 1A. Entities and/or phrases of the candidate true sentence 1A (e.g., identified using any suitable combination of a discourse tree, a communicative discourse tree, a syntax tree, and/or ontology 116 of FIG. 1) may be used to replace and/or augment the entities and/or phrases of raw sentence 1. By way of example, an entity (e.g., represented by value 902) of raw sentence 1 may be corrected to "1946" from "1894," as depicted in FIG. 9.

The correction module 122 may verify agreement with other substations of the same entity in the raw text (now corrected text). In some embodiments, this agreement may be assessed at the level of the whole corrected text, paragraphs, sentences, and phrases.

A set of predefined rules may be applied to assess whether the discourse structure of the corrected text deviates from the discourse structure of the raw text sentence (e.g., over a predefined threshold value indicating deviation).

Assessing deviation of the discourse structure of can include generalizing the raw sentence 1 (e.g., with the value "1894") and the corrected sentence (e.g., with the value "1946"). The raw and corrected text sentence can be generalized to identify whether the corrected text sentence deviates to far from the raw text sentence. By way of example, a CDT may be generated for each of the raw sentence 1 and the corrected sentence. The correction module 122 may compare the original CDT for the raw sentence and the resultant CDT for the corrected sentence. In some embodiments, the correction module 122 may enforce that non-trivial rhetorical relations from the raw text CDT must be retained (addressed) in the corrected text CDT. If so, then the correction may be considered to properly retain the discourse structure. However, if the corrected text CDT contain different nontrivial relations, or in a totally different order, the correction module 122 can confirm that the correction procedure broke the discourse structure and may, in some cases, discard the corrections.

Output may be generated. If the corrections/substitutions performed were found to be acceptable (e.g., the corrected entities agree with similar entities in the same sentence/other sentences, and the discourse structure of the raw sentence 1 was maintained), the output may include the corrected raw sentence, and/or an indication that the correction was successful and/or an indication of the particular corrections made. Conversely, if the corrections/substitutions performed were found to be unacceptable (e.g., the corrected entities did not agree with similar entities in the same sentence/other sentences, or the discourse structure of the raw sentence 1 was not sufficiently maintained), the output may include the raw sentence 1 and/or an indication that the correction was unsuccessful.

The same process may be repeated for each raw sentence 1-7. Candidate true sentence 1A-6A correspond to raw sentences 1-6. For example, candidate true sentence 1A is selected as the optimal sentence for corrections to be made to raw sentence 1; candidate true sentence 2A is selected as the optimal sentence for corrections to be made to raw sentence 2; candidate true sentence 3A is selected as the optimal sentence for corrections to be made to raw sentence 3, and so on. Since multiple sentences are corrected in corrected text 900, substitutions should be propagated according to the structure of coreferences in raw text 800. Overall discourse structure must be assessed in comparison with that of the raw text as well. In some embodiments, the output may be generated only after each of the raw sentences 1-7 has been processed for correction. Raw sentence and corresponding true sentences are shown in FIG. 9. Incorrect values (the ones deviating from the value provided in the true statement or values provided in other raw sentences (e.g., as is the case in raw sentence 7) are bolded. True sentences values will be used to update the ones in raw sentences include values 902, 904, 906, and 908. A relation and attribute name in raw sentence 2 which is confirmed by true sentence 2A is shown at 910.

Raw sentences 1-6 can be successfully corrected. In these sentences, relations and attribute type can be retained, and the values should be taken from true sentences. Raw sentences 6 and 7 do not yield meaningful factoid sentences and need to be ignored. The correction rules utilized to correct sentences of raw text 800 may specify that:

1) If an individual value can be updated, the sentence is retained;
2) If no associated fact can be identified, the sentence is removed and instead the closest sentence found in an available source is used. The syntactic structure of the mined sentence may be updated to match with the DL generated sentence. To do that, the syntactic skeleton of the DL sentence is formed and generalize with the true sentence obtained from the source. And
3) The discourse structure and coreference structure of the raw text is to be maintained.

Figure 10:
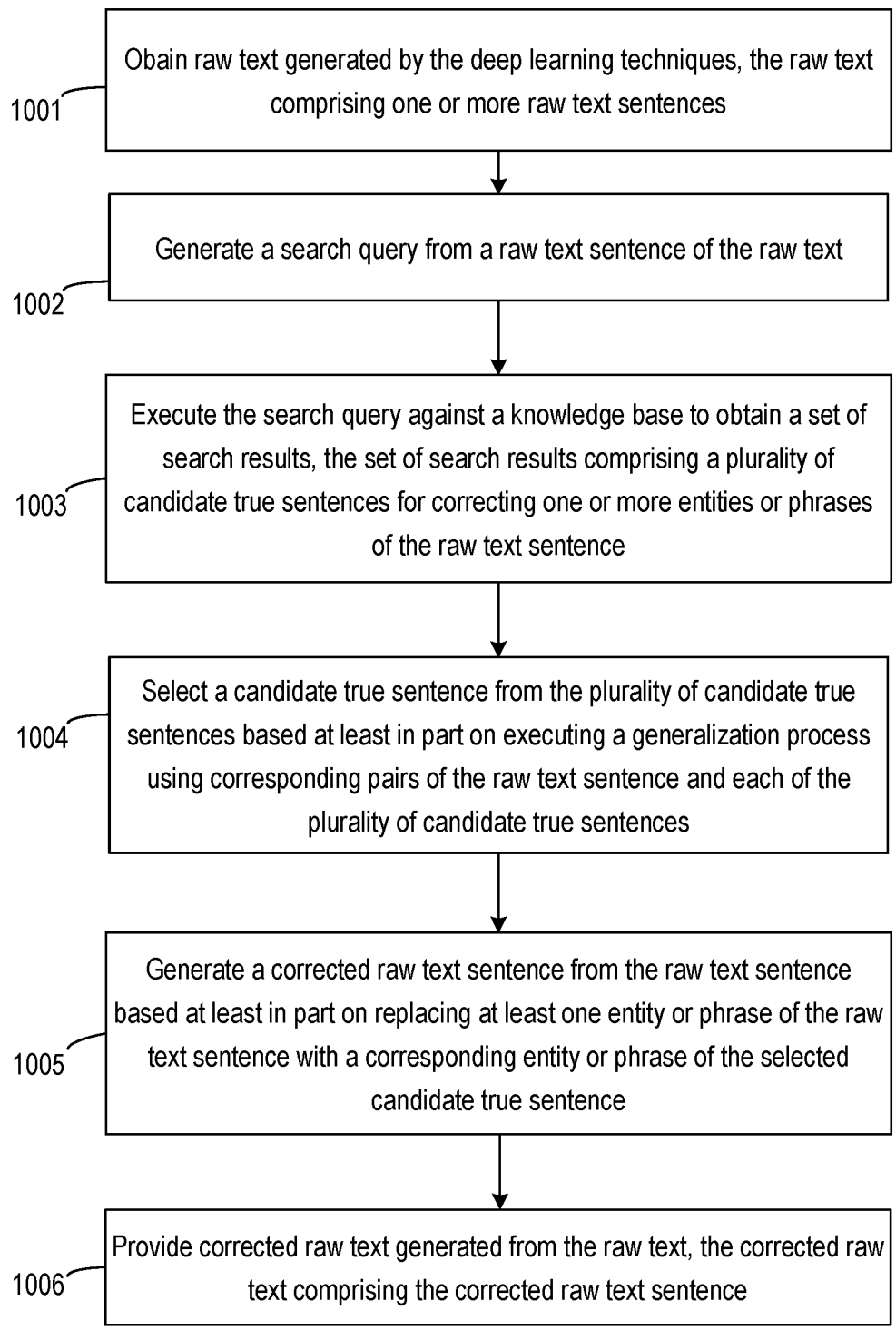
FIG. 10 depicts a flow for a method for correcting raw text generated by deep learning techniques, in accordance with at least one embodiment.

FIG. 10 depicts a flow for a method 1000 for correcting raw text generated by deep learning techniques (e.g., raw text 800 of FIG. 8), in accordance with at least one embodiment. In some embodiments, the method 1000 may be performed by the computing device 102 of FIG. 1 (e.g., application 106 of FIG. 1, the correction module 122 of FIG. 1). The operations of method 1000 may be performed in any suitable order. In some embodiments, the method 1000 may include more operations than those depicted in FIG. 10, or fewer operations than those depicted in FIG. 10.

The method 1000 may begin at 1001, where raw text generated by the deep learning techniques (e.g., raw text 800) is obtained. In some embodiments the raw text comprises one or more raw text sentences. For example, raw text 800 comprises sentences 1-7 as depicted in FIG. 8. The raw text may be generated using any suitable deep learning techniques as discussed above in connection with FIG. 1.

At 1002, a search query from a raw text sentence of the raw text. By way of example, the search query can be generated using a discourse tree (e.g., DT 300 of FIG. 3), a communicative discourse tree (CDT generated as described in FIG. 4), an ontology (e.g., ontology 116 of FIG. 1), or any suitable combination of the above as discussed in connection with FIG. 2.

At 1003, the search query may be executed against a knowledge base and/or corpus of text to obtain a set of search results. In some embodiments, the set of search results comprises a plurality of candidate true sentences for correcting an entity or phrase of the raw text sentence. For example, the set of search results for a query generated from raw sentence 1 of FIG. 9 may include candidate true sentence 1A depicted in FIG. 9.

At 1004, a candidate true sentence (e.g., candidate true sentence 1A) may be selected from the plurality of candidate true sentences based at least in part on executing a generalization process using corresponding pairs of the raw text sentence and each of the plurality of candidate true sentences. The generalization process is disclosed above in connection with FIG. 6.

At 1005, a corrected text sentence from the raw text sentence based at least in part on replacing at least one entity or phrase of the raw text sentence with a corresponding entity or phrase of the selected candidate true sentence. Rules and operations for replacing and/or retaining entities and/or phrases is discussed above in connection with FIG. 9.

At 1006, corrected text generated from the raw text may be provided. In some embodiments, the corrected text comprises the corrected text sentence.

Exemplary Computing Systems

Figure 11:
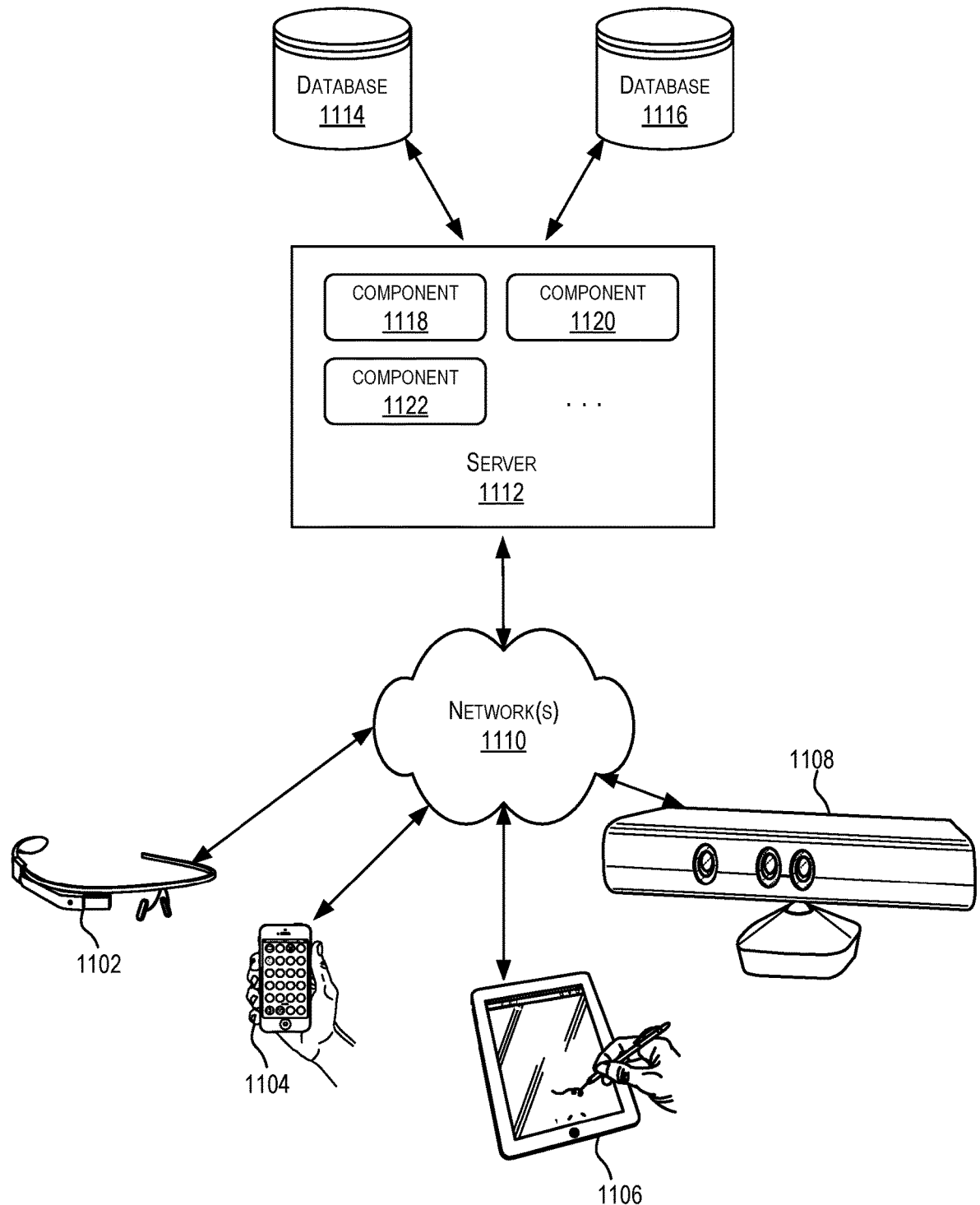
FIG. 11 depicts a simplified diagram of a distributed system for implementing one of the aspects, in accordance with at least one embodiment.

FIG. 11 depicts a simplified diagram of a distributed system 1100 for implementing one of the aspects. In the illustrated aspect, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various aspects, server 1112 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. These services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of distributed system 1100 are shown as being implemented on server 1112. In other aspects, one or more of the components of distributed system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The aspect shown in the figure is thus one example of a distributed system for implementing an aspect system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including, without limitation, the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.9 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various aspects, server 1112 may be adapted to run one or more services or software applications described in the foregoing disclosure. For example, server 1112 may correspond to a server for performing processing described above according to an aspect of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of aspects, databases 1114 and 1116 may reside in a storage-area network (SAN). Similarly, any necessary files for performing the functions attributed to server 1112 may be stored locally on server 1112 and/or remotely, as appropriate. In one set of aspects, databases 1114 and 1116 may include relational databases, such as databases provided by Oracle, that are adapted to store, update, and retrieve data in response to SQL-formatted commands.

Figure 12:
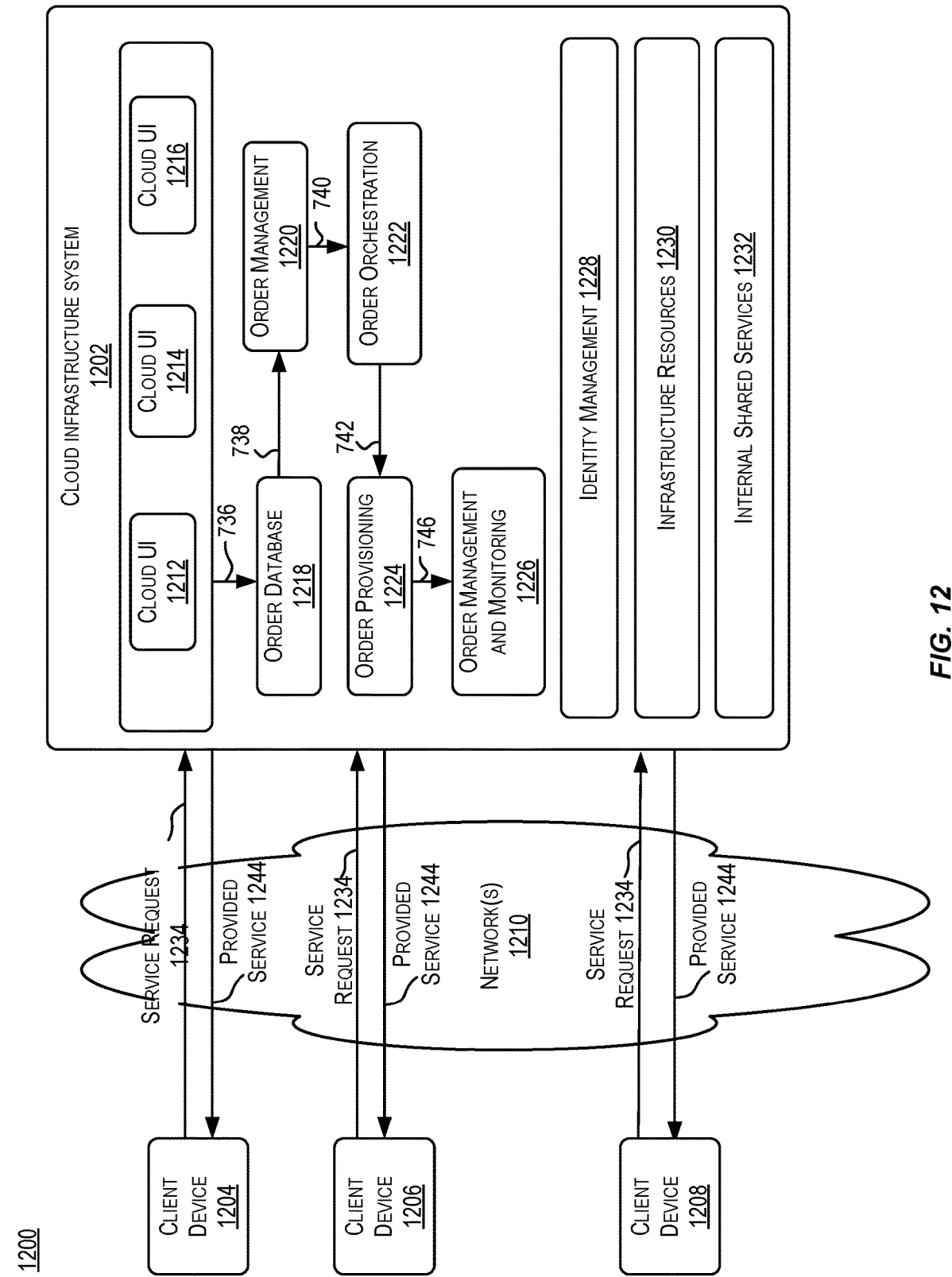
FIG. 12 is a simplified block diagram of one or more components of a system environment by which services provided by one or more components of an aspect system may be offered as cloud services, in accordance with an aspect of the present disclosure, in accordance with at least one embodiment.

FIG. 12 is a simplified block diagram of one or more components of a system environment 1200 by which services provided by one or more components of an aspect system may be offered as cloud services, in accordance with an aspect of the present disclosure. In the illustrated aspect, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the aspect shown in the figure is only one example of a cloud infrastructure system that may incorporate an aspect of the invention. In some embodiments, cloud infrastructure system 1202 may have more or fewer components than shown in the figure, may combine two or more components, or may have a different configuration or arrangement of components.

Client computing devices 1204, 1206, and 1208 may be devices similar to those described above for client computing devices 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients computing devices 1204, 1206, and 1208 and cloud infrastructure system 1202. Each network may be any type of network familiar to those skilled in the art that can support data communications using any of a variety of commercially available protocols, including those described above for network(s) 1210.

Cloud infrastructure system 1202 may comprise one or more computers and/or servers that may include those described above for server 1212.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1202 may also include infrastructure resources 1230 for providing the resources used to provide various services to customers of the cloud infrastructure system. In one aspect, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1202 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain aspects, cloud infrastructure system 1202 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1202, and the like.

In one aspect, as depicted in the figure, cloud management functionality may be provided by one or more modules, such as an order management module 1220, an order orchestration module 1222, an order provisioning module 1211, an order management and monitoring module 1210, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client computing device 1204, 1206 or 1208, may interact with cloud infrastructure system 1202 by requesting one or more services provided by cloud infrastructure system 1202 and placing an order for a subscription for one or more services offered by cloud infrastructure system 1202. In certain aspects, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 in which the customer intends to subscribe.

After an order has been placed by the customer, the order information is received via the cloud UIs, 1210, 1214 and/or 1216.

At operation 1236, the order is stored in order database 1218. Order database 1218 can be one of several databases operated by cloud infrastructure system 1202 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1211.

In certain aspects, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1211 to allocate resources and configure those resources needed to fulfill the subscription order. Order provisioning module 1211 enables the allocation of resources for the services ordered by the customer. Order provisioning module 1211 provides a level of abstraction between the cloud services provided by cloud infrastructure system 1202 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client computing devices 1204, 1206 and/or 1208 by order provisioning module 1211 of cloud infrastructure system 1202.

At operation 1246, the customer's subscription order may be managed and tracked by an order management and monitoring module 1210. In some instances, order management and monitoring module 1210 may be configured to collect usage statistics for the services in the subscription order, such as the amount of storage used, the amount data transferred, the number of users, and the amount of system up time and system down time.

In certain aspects, cloud infrastructure system 1202 may include an identity management module 1228. Identity management module 1228 may be configured to provide identity services, such as access management and authorization services in cloud infrastructure system 1202. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.). Identity management module 1228 may also include the management of descriptive information about each customer and about how and by whom that descriptive information can be accessed and modified.

Figure 13:
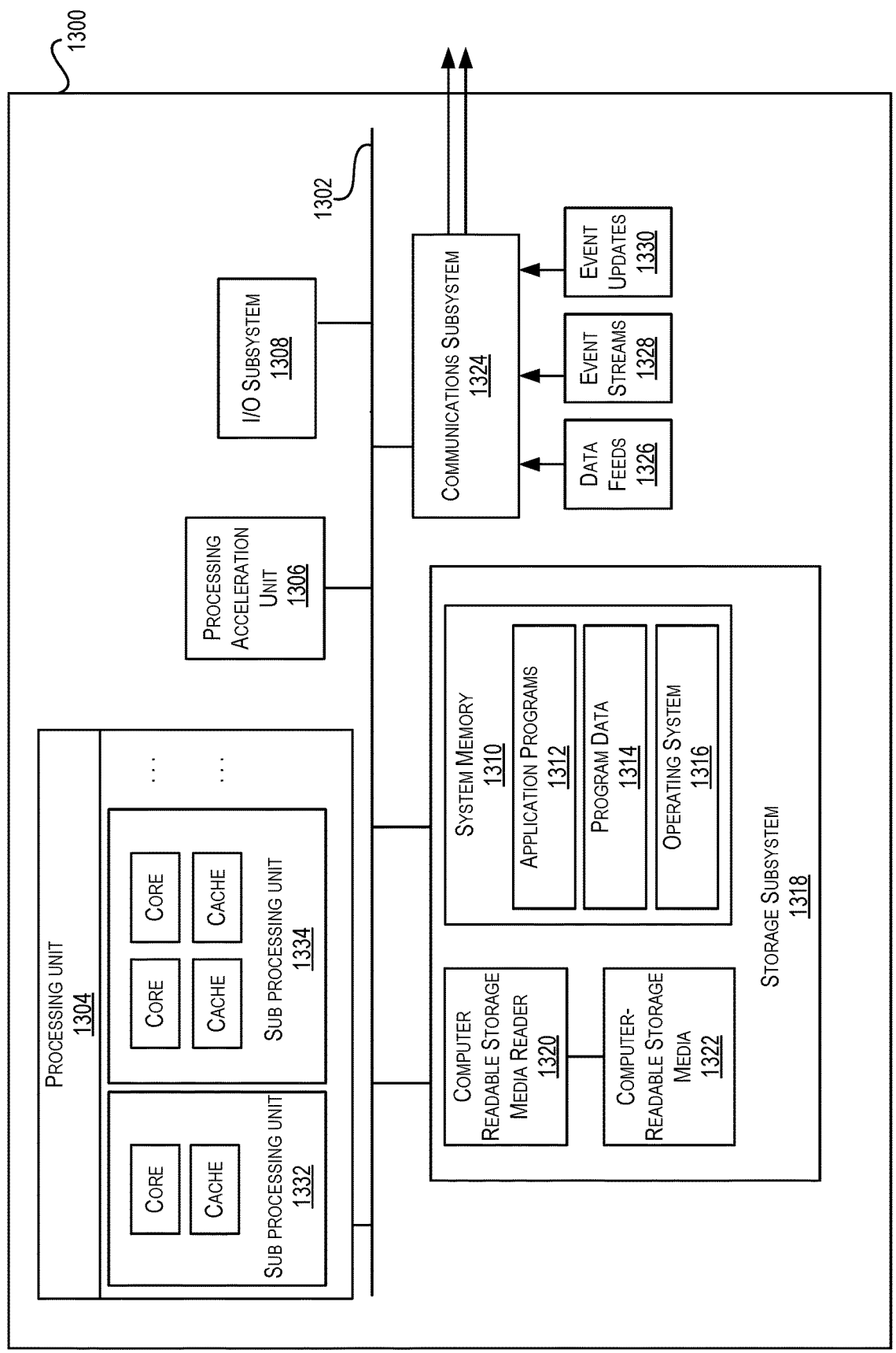
FIG. 13 illustrates an exemplary computing subsystem, in which various aspects may be implemented, in accordance with at least one embodiment.

FIG. 13 illustrates an exemplary computing subsystem 1300, in which various aspects may be implemented. The computing subsystem 1300 may be used to implement any of the computing subsystems described above. As shown in the figure, computing subsystem 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1311. Storage subsystem 1318 includes tangible computer-readable storage media 1309 and a system memory 1310.

Bus subsystem 1302 provides a mechanism for letting the various components and subsystems of computing subsystem 1300 communicate with each other as intended. Although bus subsystem 1302 is shown schematically as a single bus, alternative aspects of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1186.1 standard.

Processing unit 1304, which can be implemented as one or more integrated circuits (e.g., a conventional microprocessor or microcontroller), controls the operation of computing subsystem 1300. One or more processors may be included in processing unit 1304. These processors may include single-core or multicore processors. In certain aspects, processing unit 1304 may be implemented as one or more independent processing units 1332 and/or 1334 with single or multicore processors included in each processing unit. In other aspects, processing unit 1304 may also be implemented as a quad-core processing unit formed by integrating two dual-core processors into a single chip.

In various aspects, processing unit 1304 can execute a variety of programs in response to program code and can maintain multiple concurrently executing programs or processes. At any given time, some or all of the program code to be executed can be resident in processing unit(s) 1304 and/or in storage subsystem 1318. Through suitable programming, processing unit(s) 1304 can provide various functionalities described above. Computing subsystem 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computing subsystem 1300, system memory 1310 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random-access memory (SRAM) or dynamic random access memory (DRAM). In some implementations, a basic input/output system (BIOS), containing the basic routines that help to transfer information between elements within computing subsystem 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some aspects. Software (programs, code modules, instructions) that when executed by a processor, provides the functionality described above and may be stored in storage subsystem 1318. These software modules or instructions may be executed by processing unit 1304. Storage subsystem 1318 may also provide a repository for storing data used in accordance with the present invention.

Storage subsystem 1318 may also include a computer-readable storage media reader 1320 that can further be connected to computer-readable storage media 1309. Together and optionally, in combination with system memory 1310, computer-readable storage media 1309 may comprehensively represent remote, local, fixed, and/or removable storage devices plus storage media for temporarily and/or more permanently containing, storing, transmitting, and retrieving computer-readable information.

Computer-readable storage media 1309 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information, and which can be accessed by computing subsystem 1300.

By way of example, computer-readable storage media 1309 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1309 may include, but is not limited to, Zip® drives, flash memory cards, universal serial bus (USB) flash drives, secure digital (SD) cards, DVD disks, digital video tape, and the like. Computer-readable storage media 1309 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computing subsystem 1300.

Communications subsystem 1311 provides an interface to other computing subsystems and networks. Communications subsystem 1311 serves as an interface for receiving data from and transmitting data to other systems from computing subsystem 1300. For example, communications subsystem 1311 may enable computing subsystem 1300 to connect to one or more devices via the Internet. In some embodiments, communications subsystem 1311 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.9 family standards, or other mobile communication technologies, or any combination thereof), global positioning system (GPS) receiver components, and/or other components. In some embodiments, communications subsystem 1311 can provide wired network connectivity (e.g., Ethernet) in addition to or instead of a wireless interface.

In some embodiments, communications subsystem 1311 may also receive input communication in the form of structured and/or unstructured data feeds 1326, event streams 1328, event updates 1330, and the like on behalf of one or more users who may use computing subsystem 1300.

By way of example, communications subsystem 1311 may be configured to receive unstructured data feeds 1326 in real-time from users of social media networks and/or other communication services such as Twitter® feeds, Face-book® updates, web feeds such as Rich Site Summary (RSS) feeds, and/or real-time updates from one or more third party information sources.

Additionally, communications subsystem 1311 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1311 may also be configured to output the structured and/or unstructured data feeds 1326, event streams 1328, event updates 1330, and the like to one or more databases that may be in communication with one or more streaming data source computers coupled to computing subsystem 1300.

Computing subsystem 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for correcting raw text generated by deep learning techniques, the computer-implemented method comprising:
   obtaining, by a computing device, the raw text generated by the deep learning techniques, the raw text comprising one or more raw text sentences;
   generating, by the computing device, a search query from a raw text sentence of the raw text;
   transmitting, by the computing device, the search query to an online search engine via an application programming interface, wherein providing the search query causes a set of search results to be obtained based on the online search engine executing the search query against a knowledge base or a corpus of text, the set of search results comprising a plurality of candidate true sentences that can potentially be utilized to correct one or more entities or phrases of the raw text sentence;
   selecting, by the computing device, a candidate true sentence from the plurality of candidate true sentences based at least in part on executing a generalization process using corresponding pairs of the raw text sentence and each of the plurality of candidate true sentences;
   generating, by the computing device, a corrected text sentence from the raw text sentence based at least in part on replacing at least one entity or phrase of the raw text sentence with a corresponding entity or phrase of the selected candidate true sentence, wherein replacing the at least one entity or the phrase corrects an untrue portion of the raw text sentence generated by the deep learning techniques;
   validating, by the computing device, the corrected text sentence based at least in part on comparing a first communicative discourse tree generated from the corrected text sentence with a second communicative discourse tree generated from the raw text sentence; and
   providing, by the computing device to a user device, the corrected text sentence.

2. The computer-implemented method of claim 1, wherein executing the generalization process comprises generating a syntactic alignment score and a semantic alignment score for each candidate true sentence based on executing a syntactic-semantic alignment algorithm configured to determine syntactic and semantic alignment between the raw text sentence and each of the plurality of candidate true sentences, the syntactic alignment score quantifying a degree to which a syntactic representation of the raw text sentence and a syntactic representation of a respective candidate true statement agree, the semantic alignment score quantifying a degree to which a semantic representation of the raw text sentence and a semantic representation of the respective candidate true statement agree.

3. The computer-implemented method of claim 2, wherein selecting the candidate true sentence from the plurality of candidate true sentences includes selecting the candidate true sentence having: 1) a highest syntactic alignment score of syntactic alignment scores corresponding to the plurality of candidate true sentences, and/or 2) a highest semantic alignment score of the plurality of candidate true sentences.

4. The computer-implemented method of claim 1, further comprising validating the corrected text sentence, wherein validating the corrected text sentence comprises:
   generating the first communicative discourse tree for the raw text sentence;
   generating the second communicative discourse tree for the corrected text sentence; and
   identifying an alignment between the first communicative discourse tree and the second communicative discourse tree based at least in part on the comparing.

5. The computer-implemented method of claim 1, further comprising:
   generating a second search query from a second raw text sentence of the raw text;
   executing the second search query against the knowledge base or the corpus of text to obtain a second set of search results, the second set of search results comprising a second plurality of candidate true sentences for correcting an entity or phrase of the second raw text sentence;
   selecting a particular candidate true sentence from the second plurality of candidate true sentences based at least in part on executing the generalization process using corresponding pairs of the second raw text sentence and each of the second plurality of candidate true sentences; and
   generating a second corrected text sentence from the second raw text sentence based at least in part on replacing at least one entity or phrase of the second raw text sentence with a corresponding entity or phrase of the particular candidate true sentence selected, wherein the corrected text further comprises the second corrected text sentence.

6. The computer-implemented method of claim 1, wherein generating the search query comprises at least one of: 1) generating a discourse tree of the raw text sentence, the discourse tree comprising a plurality of nodes, each nonterminal node representing a rhetorical relationship between two sentence fragments of the raw text sentence and each terminal node of the nodes of the discourse tree being associated with a sentence fragment of the raw text sentence, or 2) generating a communicative discourse tree of the raw text sentence, the communicative discourse tree comprising the discourse tree, wherein terminal node corresponding to a respective sentence fragment of the raw text sentence is further associated with a verb signature.

7. A computing device, comprising:
   one or more processors; and
   one or more memories storing computer-executable instructions for correcting raw text generated by deep learning techniques, that, when executed by the one or more processors, cause the computing device to:
      obtain the raw text generated by the deep learning techniques, the raw text comprising one or more raw text sentences;
      generate a search query from a raw text sentence of the raw text;
      transmit the search query to an online search engine via an application programming interface, wherein providing the search query causes a set of search results to be obtained based on the online search engine execute-executing the search query against a knowledge base or a corpus of text, the set of search results comprising a plurality of candidate true sentences that can potentially be utilized to correct one or more entities or phrases of the raw text sentence;

select a candidate true sentence from the plurality of candidate true sentences based at least in part on executing a generalization process using corresponding pairs of the raw text sentence and each of the plurality of candidate true sentences;

generate a corrected text sentence from the raw text sentence based at least in part on replacing at least one entity or phrase of the raw text sentence with a corresponding entity or phrase of the selected candidate true sentence, wherein replacing the at least one entity or the phrase corrects an untrue portion of the raw text sentence generated by the deep learning techniques;

validate the corrected text sentence based at least in part on comparing a first communicative discourse tree generated from the corrected text sentence with a second communicative discourse tree generated from the raw text sentence; and provide, to a user device, the corrected text sentence.

8. The computing device of claim 7, wherein executing the generalization process causes the computing device to generate a syntactic alignment score and a semantic alignment score for each candidate true sentence based on executing a syntactic-semantic alignment algorithm, the syntactic alignment score quantifying a degree to which a syntactic representation of the raw text sentence and a syntactic representation of a respective candidate true statement agree, the semantic alignment score quantifying a degree to which a semantic representation of the raw text sentence and a semantic representation of the respective candidate true statement agree.

9. The computing device of claim 8, wherein selecting the candidate true sentence from the plurality of candidate true sentences includes selecting the candidate true sentence having: 1) a highest syntactic alignment score of syntactic alignment scores corresponding to the plurality of candidate true sentences, and/or 2) a highest semantic alignment score of the plurality of candidate true sentences.

10. The computing device of claim 7, wherein executing the instructions further causes the computing device to validate the corrected text sentence, wherein validating the corrected text sentence causes the computing device to:

generate the first communicative discourse tree for the raw text sentence;

generate the second communicative discourse tree for the corrected text sentence; and identify an alignment between the first communicative discourse tree and the second communicative discourse tree based at least in part on the comparing.

11. The computing device of claim 7, wherein executing the instructions further causes the computing device to:

generate a second search query from a second raw text sentence of the raw text;

execute the second search query against the knowledge base or the corpus of text to obtain a second set of search results, the second set of search results comprising a second plurality of candidate true sentences for correcting an entity or phrase of the second raw text sentence;

select a particular candidate true sentence from the second plurality of candidate true sentences based at least in part on executing the generalization process using corresponding pairs of the second raw text sentence and each of the second plurality of candidate true sentences; and generate a second corrected text sentence from the second raw text sentence based at least in part on replacing at least one entity or phrase of the second raw text sentence with a corresponding entity or phrase of the particular candidate true sentence selected, wherein the corrected text further comprises the second corrected text sentence.

12. The computing device of claim 7, wherein generating the search query comprises at least one of: 1) generating a discourse tree of the raw text sentence, the discourse tree comprising a plurality of nodes, each nonterminal node representing a rhetorical relationship between two sentence fragments of the raw text sentence and each terminal node of the nodes of the discourse tree being associated with a sentence fragment of the raw text sentence, or 2) generating a communicative discourse tree of the raw text sentence, the communicative discourse tree comprising the discourse tree, wherein terminal node corresponding to a respective sentence fragment of the raw text sentence is further associated with a verb signature.

13. A non-transitory computer readable storage medium storing instructions for correcting raw text generated by deep learning techniques, that, when executed by one or more processors of a computing device, cause the computing device to:

obtain the raw text generated by the deep learning techniques, the raw text comprising one or more raw text sentences;

generate a search query from a raw text sentence of the raw text;

transmit the search query to an online search engine via an application programming interface, wherein providing the search query causes a set of search results to be obtained based on the online search engine executing the search query against a knowledge base or a corpus of text, the set of search results comprising a plurality of candidate true sentences that can potentially be utilized to correct one or more entities or phrases of the raw text sentence;

select a candidate true sentence from the plurality of candidate true sentences based at least in part on executing a generalization process using corresponding pairs of the raw text sentence and each of the plurality of candidate true sentences;

generate a corrected text sentence from the raw text sentence based at least in part on replacing at least one entity or phrase of the raw text sentence with a corresponding entity or phrase of the selected candidate true sentence, wherein replacing the at least one entity or the phrase corrects an untrue portion of the raw text sentence generated by the deep learning techniques;

validate the corrected text sentence based at least in part on comparing a first communicative discourse tree generated from the corrected text sentence with a second communicative discourse tree generated from the raw text sentence; and provide, to a user device, the corrected text sentence.

14. The non-transitory computer readable storage medium of claim 13, wherein executing the generalization process causes the computing device to generate a syntactic alignment score and a semantic alignment score for each candidate true sentence based on executing a syntactic-semantic alignment algorithm, the syntactic alignment score quantifying a degree to which a syntactic representation of the raw text sentence and a syntactic representation of a respective candidate true statement agree, the semantic alignment score quantifying a degree to which a semantic representation of the raw text sentence and a semantic representation of the respective candidate true statement agree.

15. The non-transitory computer readable storage medium of claim 14, wherein selecting the candidate true sentence from the plurality of candidate true sentences includes selecting the candidate true sentence having: 1) a highest syntactic alignment score of syntactic alignment scores corresponding to the plurality of candidate true sentences, and/or 2) a highest semantic alignment score of the plurality of candidate true sentences.

16. The non-transitory computer readable storage medium of claim 13, wherein executing the instructions further causes the computing device to validate the corrected text sentence, wherein validating the corrected text sentence causes the computing device to:
  generate the first communicative discourse tree for the raw text sentence;
  generate the second communicative discourse tree for the corrected text sentence; and
  identify an alignment between the first communicative discourse tree and the second communicative discourse tree based at least in part on the comparing.

17. The non-transitory computer readable storage medium of claim 13, wherein generating the search query comprises at least one of: 1) generating a discourse tree of the raw text sentence, the discourse tree comprising a plurality of nodes, each nonterminal node representing a rhetorical relationship between two sentence fragments of the raw text sentence and each terminal node of the nodes of the discourse tree being associated with a sentence fragment of the raw text sentence, or 2) generating a communicative discourse tree of the raw text sentence, the communicative discourse tree comprising the discourse tree, wherein terminal node corresponding to a respective sentence fragment of the raw text sentence is further associated with a verb signature.

18. The computer-implemented method of claim 1, further comprising calculating, by the computing device, a semantic alignment score that represents semantic alignment between the raw text sentence and a particular candidate true sentence of the plurality of candidate true sentences, the semantic alignment score being calculated based at least in part on generating a first abstract meaning representation graph from the raw text sentence and generating a second abstract meaning representation graph from the particular candidate true sentence.

19. The computing device of claim 7, wherein executing the instructions further causes the computing device to calculate a semantic alignment score that represents semantic alignment between the raw text sentence and a particular candidate true sentence of the plurality of candidate true sentences, the semantic alignment score being calculated based at least in part on generating a first abstract meaning representation graph from the raw text sentence and generating a second abstract meaning representation graph from the particular candidate true sentence.

20. The non-transitory computer readable storage medium of claim 13, wherein executing the instructions further causes the computing device to calculate a semantic alignment score that represents semantic alignment between the raw text sentence and a particular candidate true sentence of the plurality of candidate true sentences, the semantic alignment score being calculated based at least in part on generating a first abstract meaning representation graph from the raw text sentence and generating a second abstract meaning representation graph from the particular candidate true sentence.

* * * * *